United States Patent
Lee et al.

(10) Patent No.: US 12,316,449 B2
(45) Date of Patent: May 27, 2025

(54) METHOD AND APPARATUS FOR RATE-MATCHING CONTROL INFORMATION IN NR V2X

(71) Applicant: LG Electronics Inc., Seoul (KR)

(72) Inventors: Seungmin Lee, Seoul (KR); Hanbyul Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 17/782,260

(22) PCT Filed: Dec. 3, 2020

(86) PCT No.: PCT/KR2020/017519
§ 371 (c)(1),
(2) Date: Jun. 3, 2022

(87) PCT Pub. No.: WO2021/112575
PCT Pub. Date: Jun. 10, 2021

(65) Prior Publication Data
US 2023/0024430 A1  Jan. 26, 2023

Related U.S. Application Data

(60) Provisional application No. 62/943,783, filed on Dec. 4, 2019.

(30) Foreign Application Priority Data

Dec. 4, 2019 (KR) .................. 10-2019-0160204

(51) Int. Cl.
*H04L 1/00* (2006.01)
*H04W 72/12* (2023.01)
*H04W 72/20* (2023.01)

(52) U.S. Cl.
CPC .......... *H04L 1/0067* (2013.01); *H04L 1/0061* (2013.01); *H04W 72/20* (2023.01)

(58) Field of Classification Search
CPC ... H04W 28/04; H04W 72/04; H04W 72/042; H04W 88/08; H04W 72/20;
(Continued)

(56) References Cited

U.S. PATENT DOCUMENTS

2012/0176924 A1 * 7/2012 Wu .................. H04W 72/541
   370/252
2015/0009949 A1 * 1/2015 Khoryaev ............ H04W 88/02
   370/329
(Continued)

FOREIGN PATENT DOCUMENTS

KR   20190104146 A  *  9/2016  .......... H04L 1/0069
KR   20190104146        9/2019
(Continued)

OTHER PUBLICATIONS

Wang et al., "BLER Performance Evaluation of LTE Device-to-Device Communications," NISTIR 8157, Nov. 9, 2016, 19 pages.

*Primary Examiner* — Peter G Solinsky
*Assistant Examiner* — Sanjay K Dewan
(74) *Attorney, Agent, or Firm* — Fish & Richardson P.C.

(57) ABSTRACT

A first device performs wireless communication by performing operations that include: attaching cyclic redundancy check (CRC) bits to first bits related to second sidelink control information (SCI), thereby acquiring second bits; acquiring third bits based on channel coding regarding the second bits; acquiring the number of first modulation symbols related to the second SCI acquiring the number of second modulation symbols related to the second SCI by adding a gamma value to the number of the first modulation symbols based on the number of at least one resource element (RE), to which the first modulation symbols are not
(Continued)

mapped, among multiple REs on a symbol, to which the last modulation symbol among the first modulation symbols is mapped, within a resource block (RB) to which the last modulation symbol belongs; and performing rate matching regarding the third bits based on the second modulation symbols.

14 Claims, 35 Drawing Sheets

(58) Field of Classification Search
CPC ............ H04W 72/1278; H04L 5/0007; H04L 1/0067; H04L 1/0061
USPC .......................................................... 370/329
See application file for complete search history.

(56) References Cited

U.S. PATENT DOCUMENTS

| | | | |
|---|---|---|---|
| 2015/0043505 A1* | 2/2015 | Kim | H04W 8/06 370/329 |
| 2019/0364585 A1* | 11/2019 | Lee | H04W 4/40 |
| 2020/0351136 A1* | 11/2020 | Hwang | H04L 27/26025 |
| 2023/0022077 A1* | 1/2023 | Liu | H04W 52/52 |
| 2023/0208690 A1* | 6/2023 | Wu | H04L 5/0044 370/329 |

FOREIGN PATENT DOCUMENTS

| | | | | |
|---|---|---|---|---|
| WO | WO 2019/004881 A1 * | 1/2019 | ............... | H04L 1/00 |
| WO | WO 2019004881 | 1/2019 | | |
| WO | WO 2019/195505 A1 * | 10/2019 | ............... | H04L 1/00 |
| WO | WO 2019195505 | 10/2019 | | |

* cited by examiner

FIG. 10
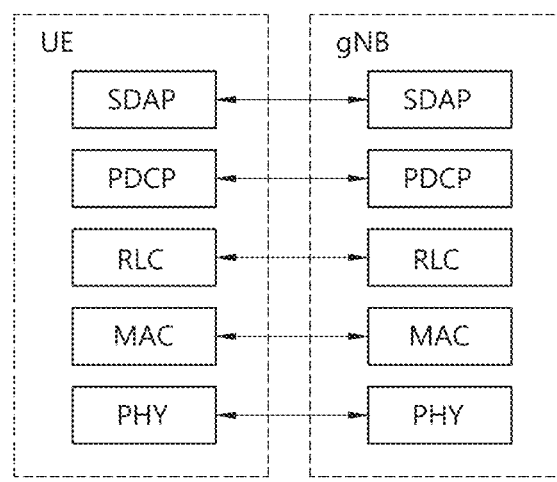
(a)
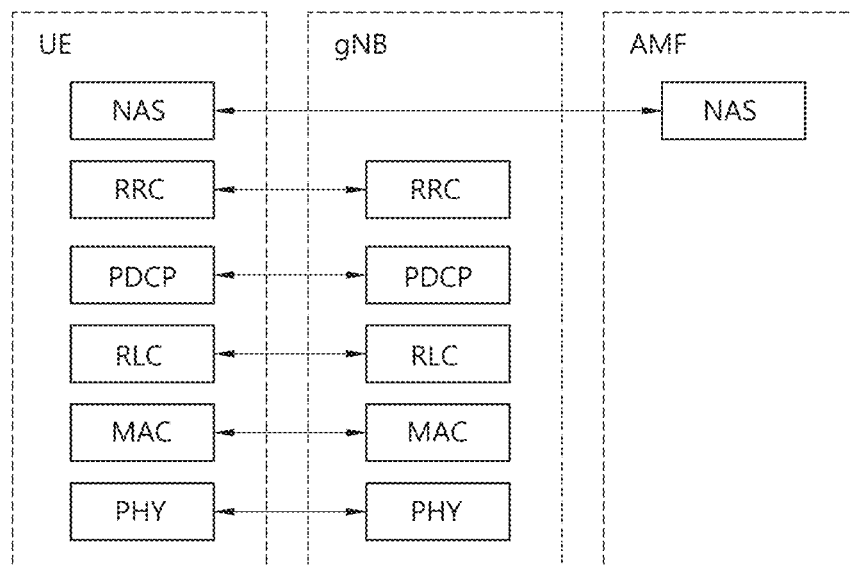
(b)

FIG. 14
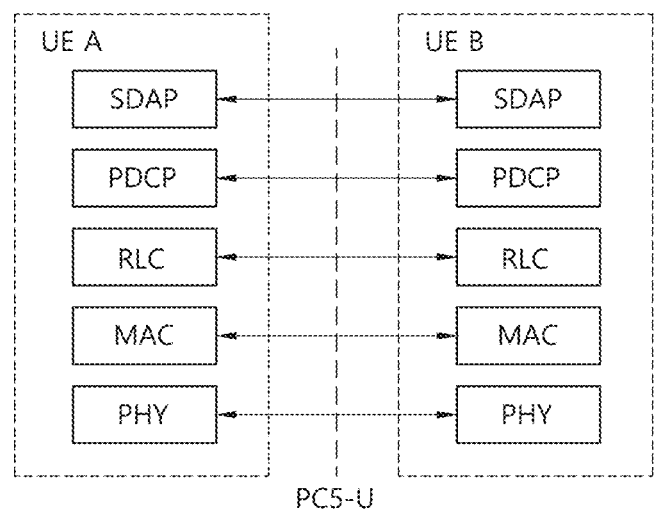
(a)
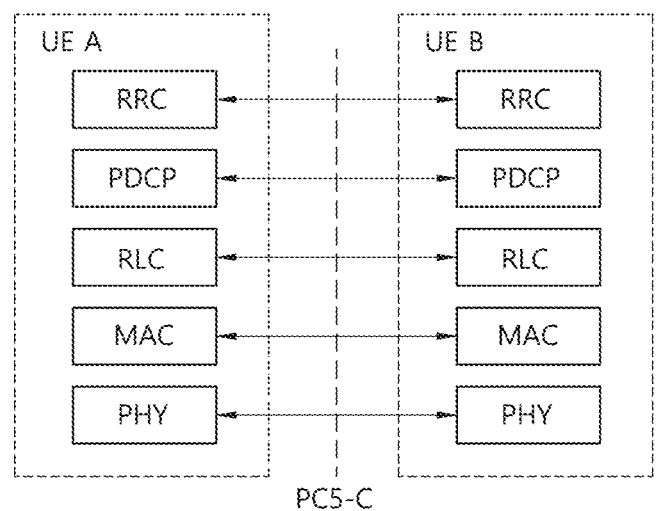
(b)

METHOD AND APPARATUS FOR RATE-MATCHING CONTROL INFORMATION IN NR V2X

CROSS-REFERENCE TO RELATED APPLICATIONS

This application is a National Stage application under 35 U.S.C. § 371 of International Application No. PCT/KR2020/017519, filed on Dec. 3, 2020, which claims the benefit of U.S. Provisional Application No. 62/943,783, filed on Dec. 4, 2019, and Korean Patent Application No. 10-2019-0160204, filed on Dec. 4, 2019. The disclosures of the prior applications are incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, if a TX UE maps a second SCI so as not to fill all REs on a specific symbol on (one) RB and transmits it to an RX UE (e.g., a type of truncation), a problem in which performance (e.g., detection performance) of the second SCI decreases may occur. Accordingly, a method for efficiently transmitting the second SCI and an apparatus supporting the same need to be proposed.

Technical Solutions

In one embodiment, a method for performing, by a first device, wireless communication is provided. The method may comprise: obtaining second bits by attaching cyclic redundancy check (CRC) bits to first bits related to second sidelink control information (SCI); obtaining third bits based on channel coding for the second bits; obtaining a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol; based on a number of at least one RE to which the first modulation symbols are not mapped among a plurality of REs on a symbol to which a last modulation symbol is mapped within a resource block (RB) to which the last modulation symbol belongs among the first modulation symbols, obtaining a number of second modulation symbols related to the second SCI by adding a gamma value to the number of first modulation symbols; and performing rate matching for the third bits, based on the number of second modulation symbols.

In one embodiment, a first device configured to perform wireless communication is provided. The first device may comprise: one or more memories storing instructions; one or more transceivers; and one or more processors connected to the one or more memories and the one or more transceivers. The one or more processors may execute the instructions to: obtain second bits by attaching cyclic redundancy check (CRC) bits to first bits related to second sidelink control information (SCI); obtain third bits based on channel coding for the second bits; obtain a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol; based on a number of at least one RE to which the first modulation symbols are not mapped among a plurality of REs on a symbol to which a last modulation symbol is mapped within a resource block (RB) to which the last modulation symbol belongs among the first modulation symbols, obtain a number of second modulation symbols related to the second SCI by adding a gamma value to the number of first modulation symbols; and perform rate matching for the third bits, based on the number of second modulation symbols.

Effects of the Disclosure

The user equipment (UE) may efficiently perform SL communication.

BRIEF DESCRIPTION OF THE DRAWINGS

FIG. 10 shows a radio protocol architecture, based on an embodiment of the present disclosure.

FIG. 14 shows a radio protocol architecture for a SL communication, based on an embodiment of the present disclosure.

Figure 1:
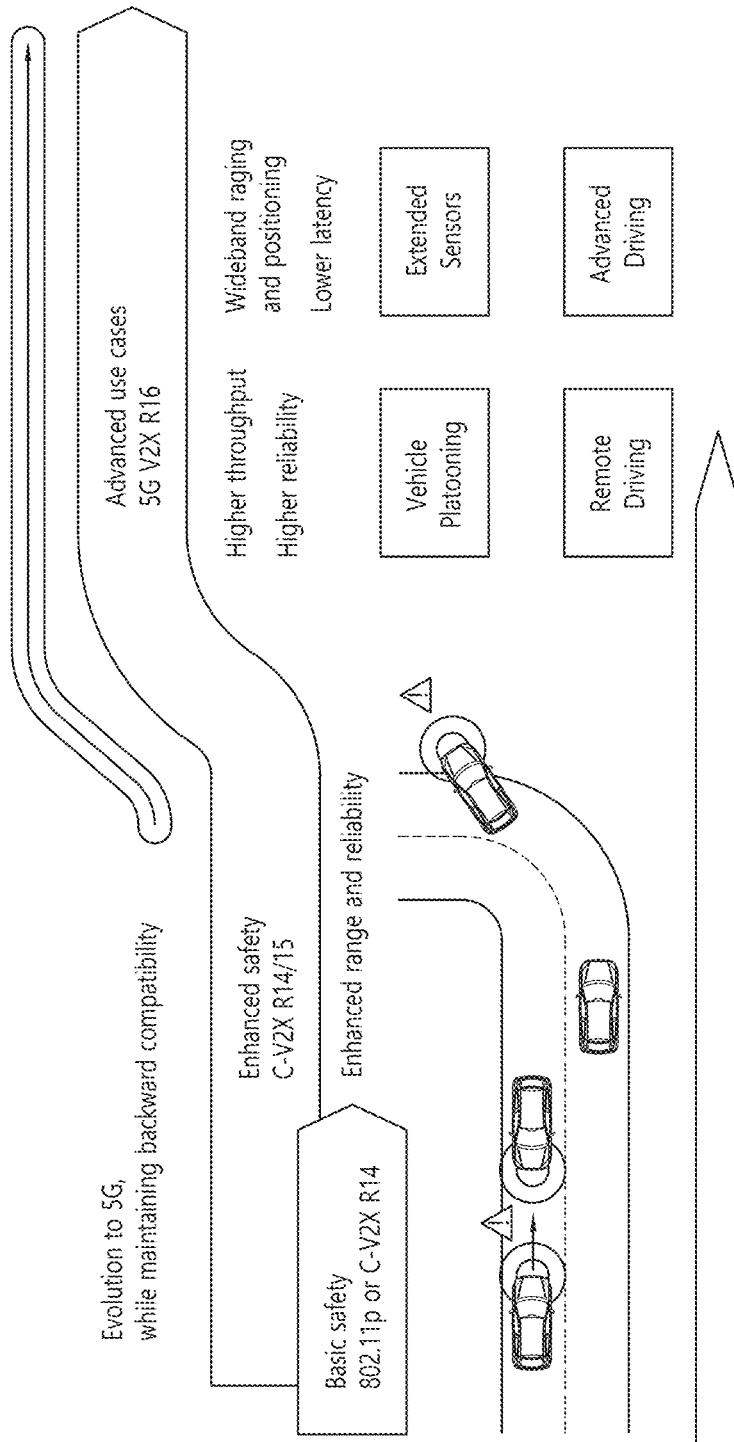
FIG. 1 is a drawing for describing V2X communication based on NR, compared to V2X communication based on RAT used before NR.

DESCRIPTION OF EXEMPLARY
EMBODIMENTS

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 2:
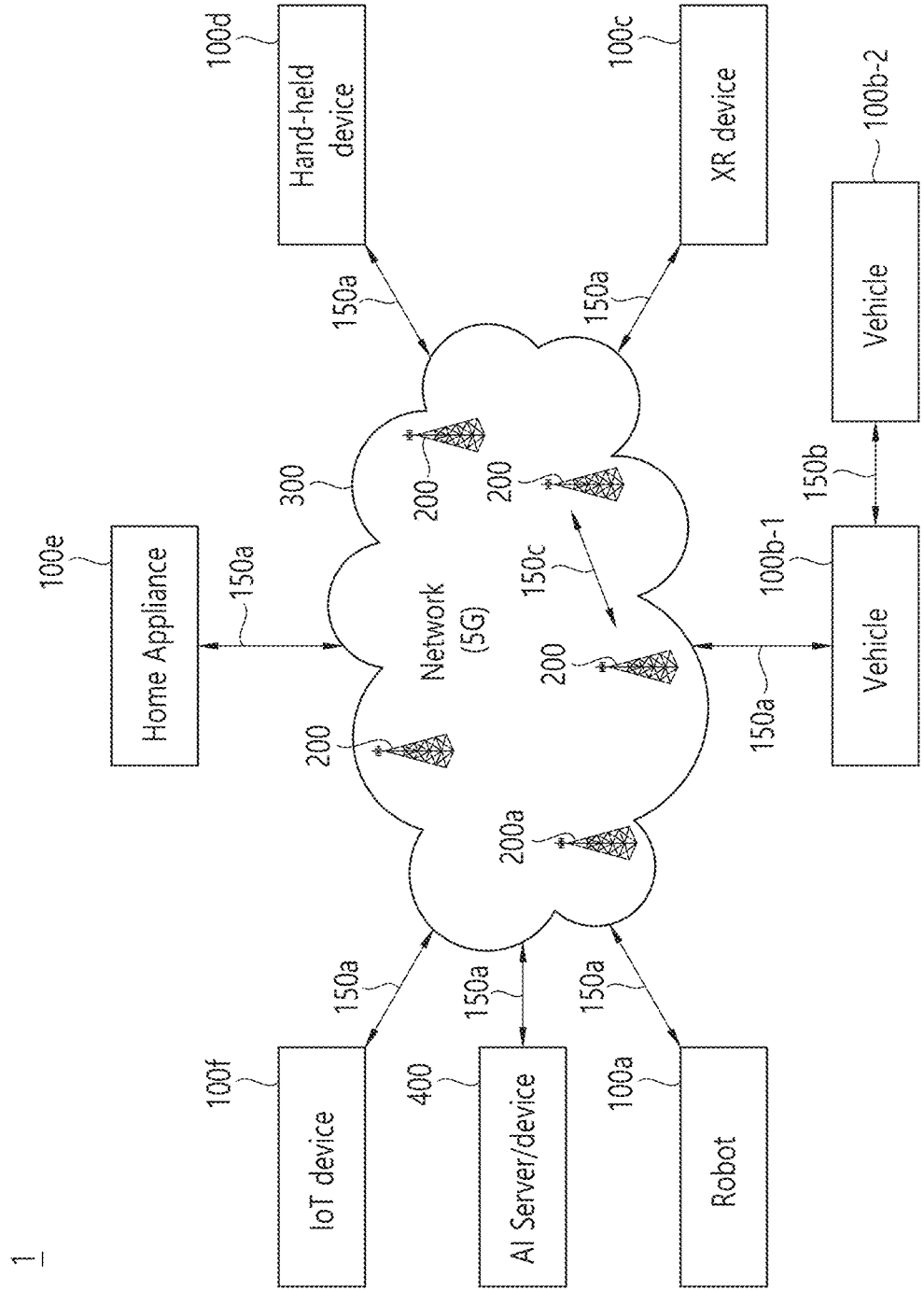
FIG. 2 shows a communication system 1, based on an embodiment of the present disclosure.

FIG. 2 shows a communication system 1, based on an embodiment of the present disclosure.

Referring to FIG. 2, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 3:
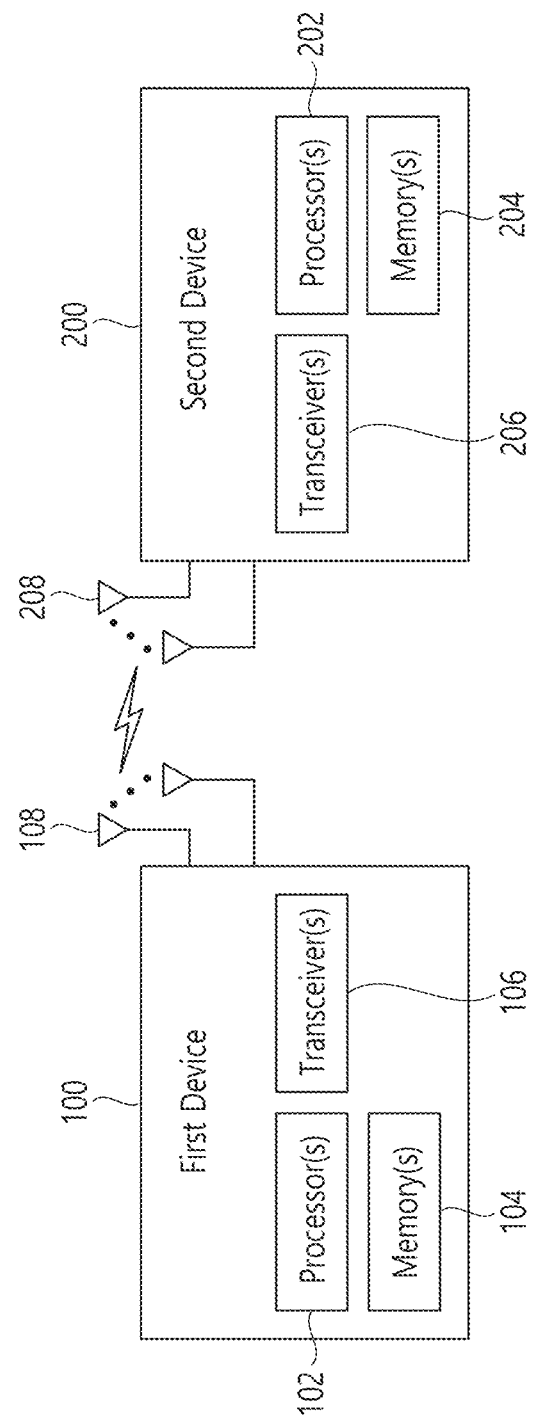
FIG. 3 shows wireless devices, based on an embodiment of the present disclosure.

FIG. 3 shows wireless devices, based on an embodiment of the present disclosure.

Referring to FIG. 3, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 4:
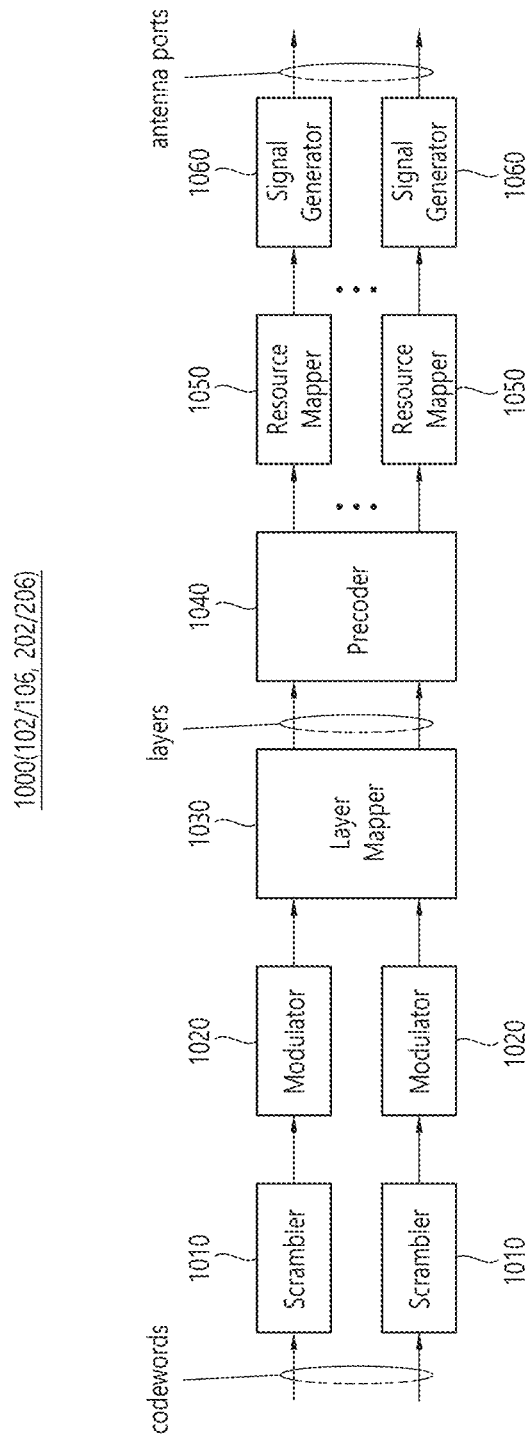
FIG. 4 shows a signal process circuit for a transmission signal, based on an embodiment of the present disclosure.

FIG. 4 shows a signal process circuit for a transmission signal, based on an embodiment of the present disclosure.

Referring to FIG. 4, a signal processing circuit 1000 may include scramblers 1010, modulators 1020, a layer mapper 1030, a precoder 1040, resource mappers 1050, and signal generators 1060. An operation/function of FIG. 4 may be performed, without being limited to, the processors 102 and 202 and/or the transceivers 106 and 206 of FIG. 3. Hardware elements of FIG. 4 may be implemented by the processors 102 and 202 and/or the transceivers 106 and 206 of FIG. 3. For example, blocks 1010 to 1060 may be implemented by the processors 102 and 202 of FIG. 3. Alternatively, the blocks 1010 to 1050 may be implemented by the processors 102 and 202 of FIG. 3 and the block 1060 may be implemented by the transceivers 106 and 206 of FIG. 3.

Codewords may be converted into radio signals via the signal processing circuit 1000 of FIG. 4. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 4. For example, the wireless devices (e.g., 100 and 200 of FIG. 3) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 5:
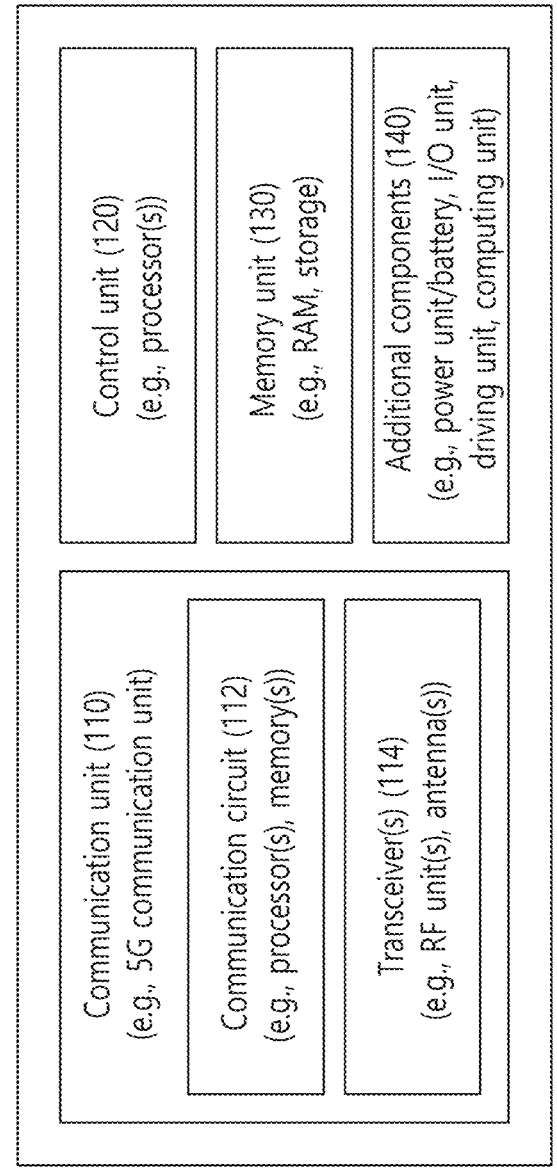
FIG. 5 shows another example of a wireless device, based on an embodiment of the present disclosure.

FIG. 5 shows another example of a wireless device, based on an embodiment of the present disclosure. The wireless device may be implemented in various forms according to a use-case/service (refer to FIG. 2).

Referring to FIG. 5, wireless devices 100 and 200 may correspond to the wireless devices 100 and 200 of FIG. 3 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 3. For example, the transceiver(s) 114 may include the one or more transceivers 106 and 206 and/or the one or more antennas 108 and 208 of FIG. 3. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 2), the vehicles (100b-1 and 100b-2 of FIG. 2), the XR device (100c of FIG. 2), the hand-held device (100d of FIG. 2), the home appliance (100e of FIG. 2), the IoT device (100f of FIG. 2), a digital broadcast terminal, a hologram device, a public safety device, an MTC device, a medicine device, a fintech device (or a finance device), a security device, a climate/environment device, the AI server/device (400 of FIG. 2), the BSs (200 of FIG. 2), a network node, etc. The wireless device may be used in a mobile or fixed place according to a use-example/service.

In FIG. 5, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 5 will be described in detail with reference to the drawings.

Figure 6:
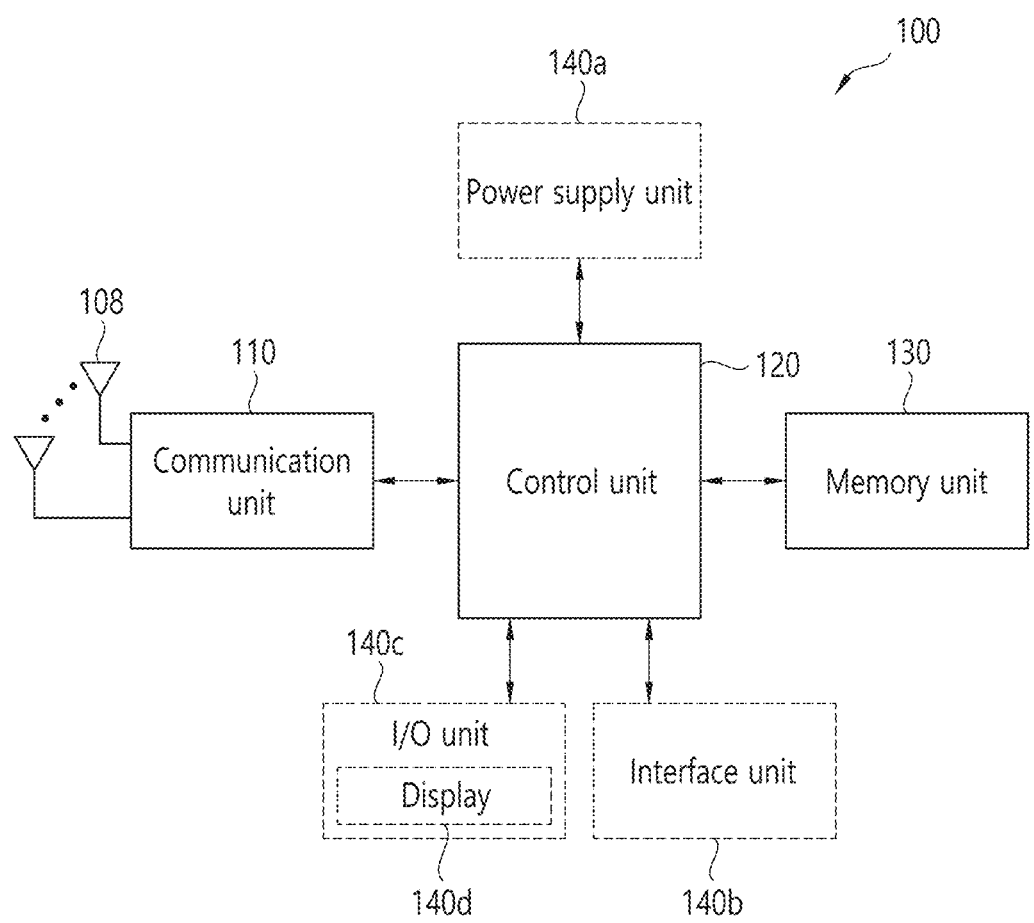
FIG. 6 shows a hand-held device, based on an embodiment of the present disclosure.

FIG. 6 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 6, a hand-held device 100 may include an antenna unit 108, a communication unit 110, a control unit 120, a memory unit 130, a power supply unit 140a, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 5, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 7:
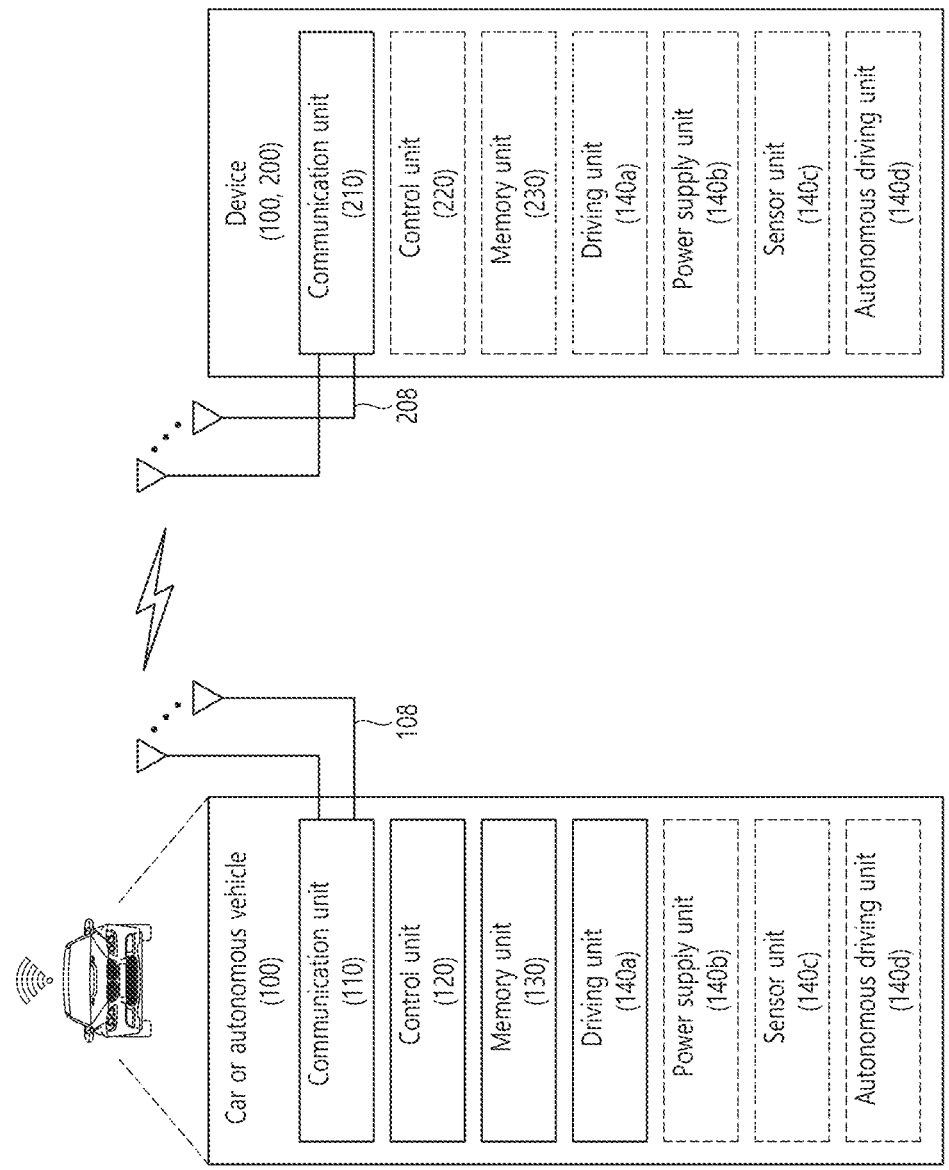
FIG. 7 shows a vehicle or an autonomous vehicle, based on an embodiment of the present disclosure.

FIG. 7 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 7, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 5, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 8:
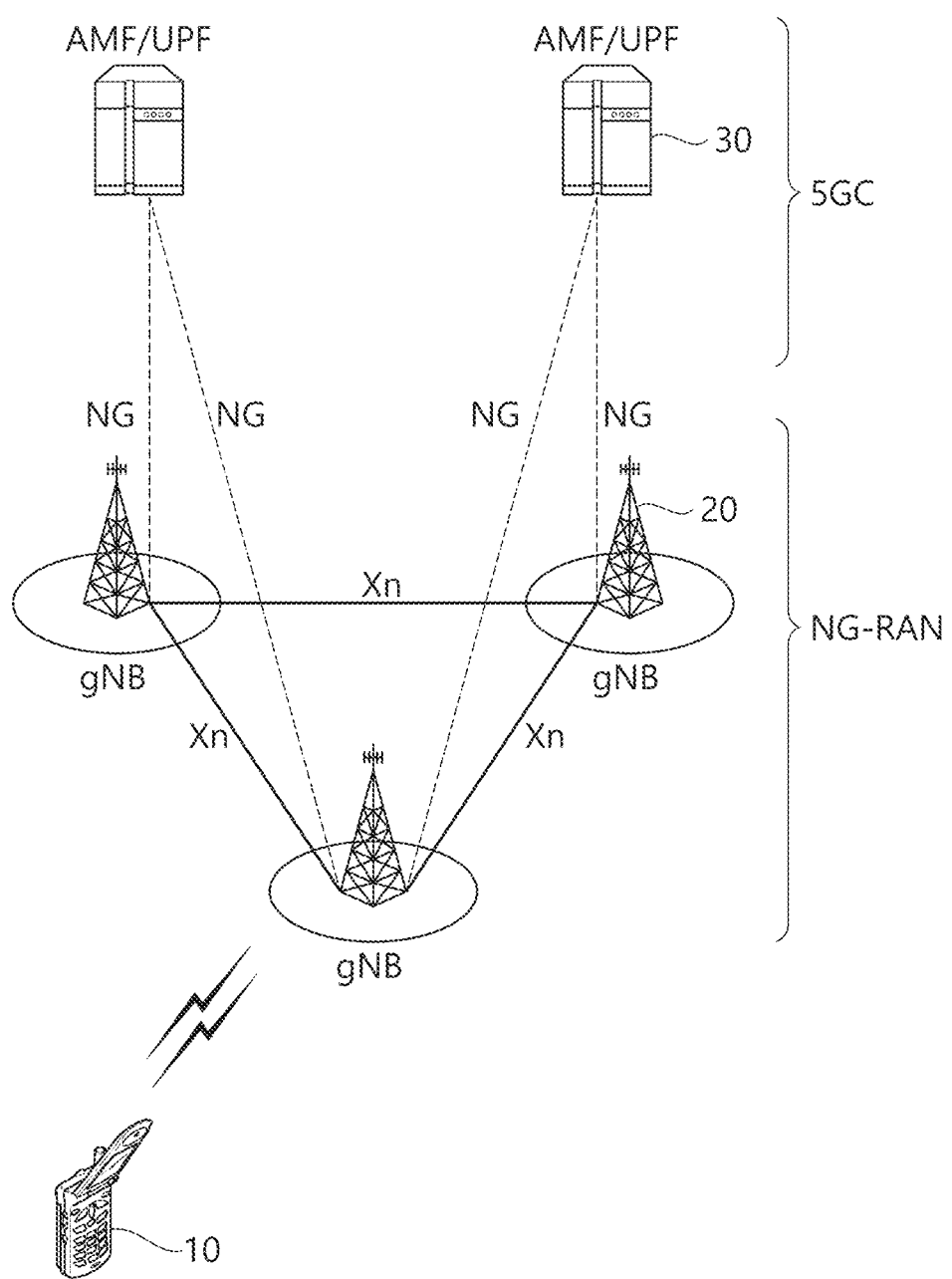
FIG. 8 shows a structure of an NR system, based on an embodiment of the present disclosure.

FIG. 8 shows a structure of an NR system, based on an embodiment of the present disclosure. The embodiment of FIG. 8 may be combined with various embodiments of the present disclosure.

Referring to FIG. 8, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 8 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 9:
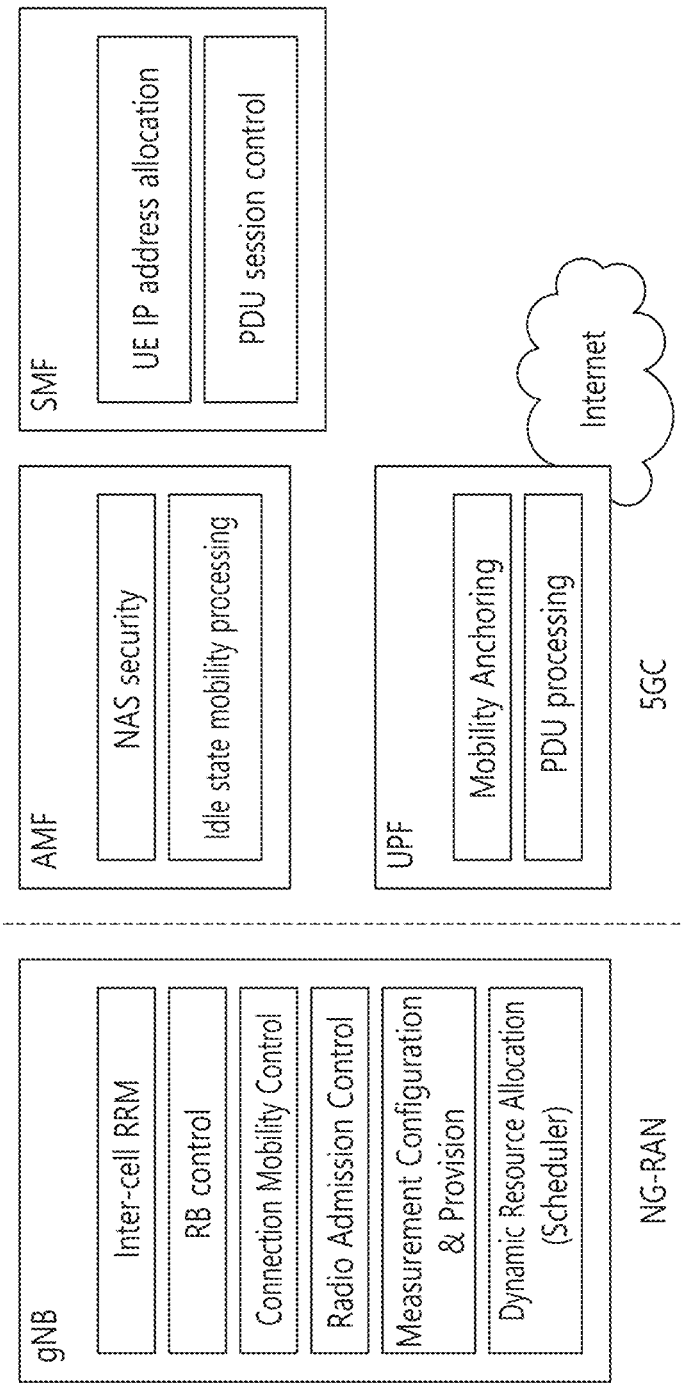
FIG. 9 shows a functional division between an NG-RAN and a 5GC, based on an embodiment of the present disclosure.

FIG. 9 shows a functional division between an NG-RAN and a 5GC, based on an embodiment of the present disclosure. The embodiment of FIG. 9 may be combined with various embodiments of the present disclosure.

Referring to FIG. 9, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 10 shows a radio protocol architecture, based on an embodiment of the present disclosure. The embodiment of FIG. 10 may be combined with various embodiments of the present disclosure. Specifically, (a) of FIG. 10 shows a radio protocol architecture for a user plane, and (b) of FIG. 10 shows a radio protocol architecture for a control plane. The user plane corresponds to a protocol stack for user data transmission, and the control plane corresponds to a protocol stack for control signal transmission.

Referring to FIG. 10, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 11:
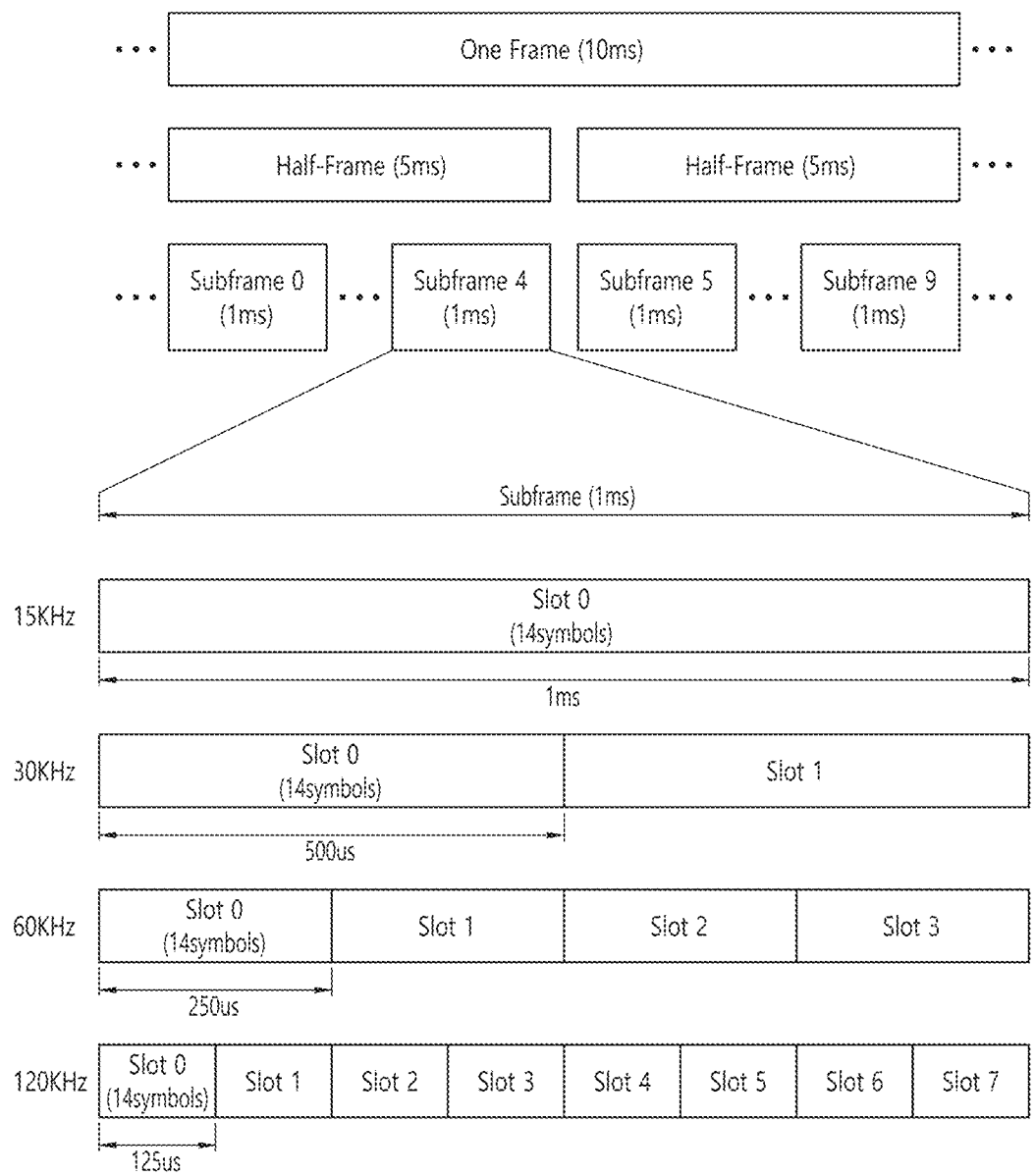
FIG. 11 shows a structure of an NR system, based on an embodiment of the present disclosure.

FIG. 11 shows a structure of an NR system, based on an embodiment of the present disclosure. The embodiment of FIG. 11 may be combined with various embodiments of the present disclosure.

Referring to FIG. 11, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 12:
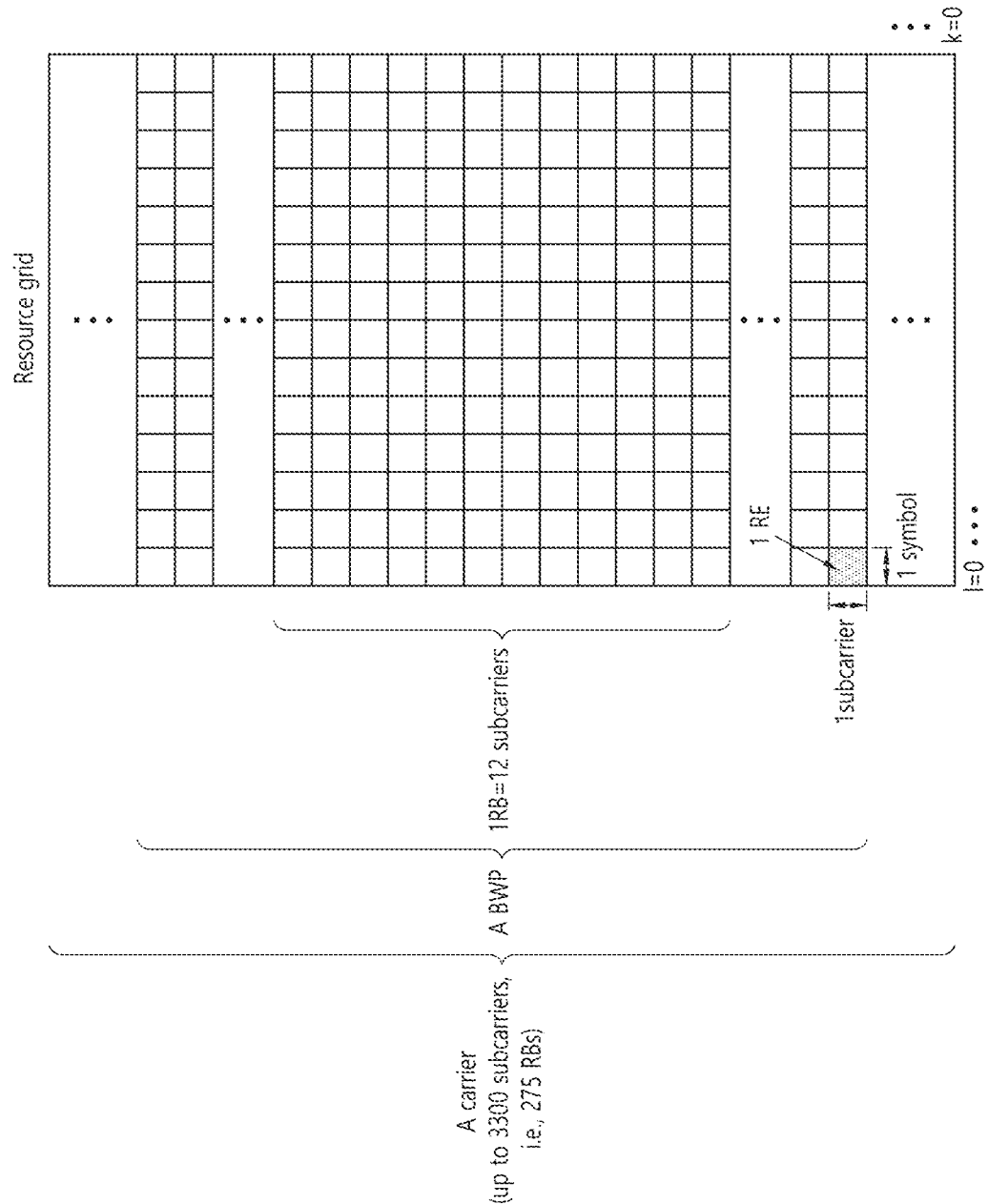
FIG. 12 shows a structure of a slot of an NR frame, based on an embodiment of the present disclosure.

FIG. 12 shows a structure of a slot of an NR frame, based on an embodiment of the present disclosure. The embodiment of FIG. 12 may be combined with various embodiments of the present disclosure.

Referring to FIG. 12, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 13:
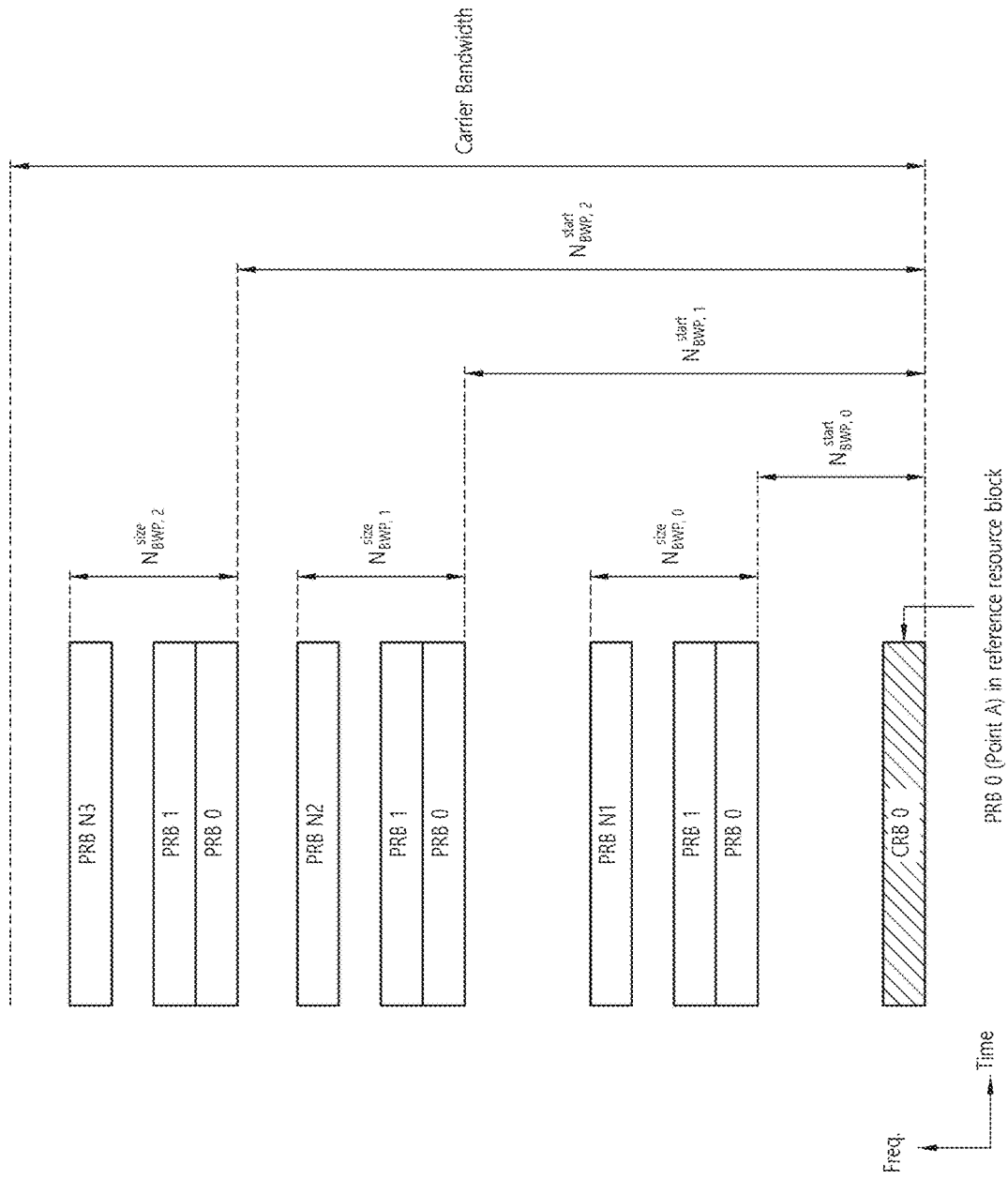
FIG. 13 shows an example of a BWP, based on an embodiment of the present disclosure.

FIG. 13 shows an example of a BWP, based on an embodiment of the present disclosure. The embodiment of FIG. 13 may be combined with various embodiments of the present disclosure. It is assumed in the embodiment of FIG. 13 that the number of BWPs is 3.

Referring to FIG. 13, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 14 shows a radio protocol architecture for a SL communication, based on an embodiment of the present disclosure. The embodiment of FIG. 14 may be combined with various embodiments of the present disclosure. More specifically, (a) of FIG. 14 shows a user plane protocol stack, and (b) of FIG. 14 shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 15:
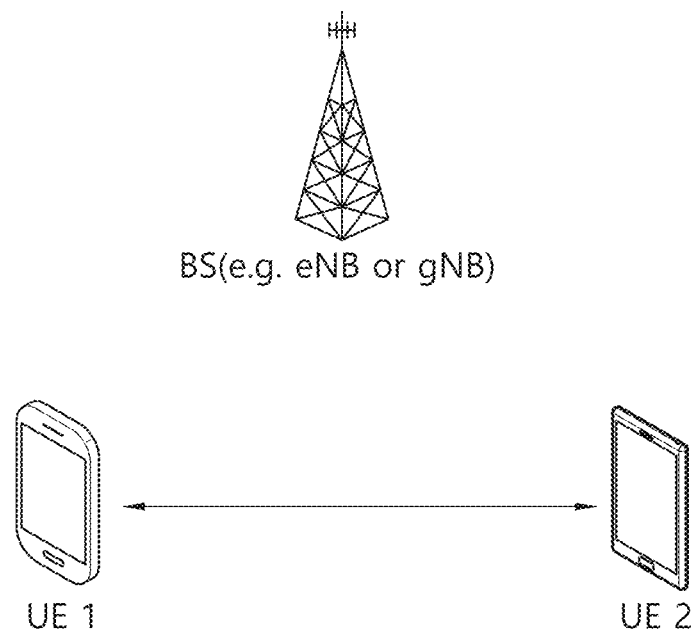
FIG. 15 shows a UE performing V2X or SL communication, based on an embodiment of the present disclosure.

FIG. 15 shows a UE performing V2X or SL communication, based on an embodiment of the present disclosure. The embodiment of FIG. 15 may be combined with various embodiments of the present disclosure.

Referring to FIG. 15, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 16:
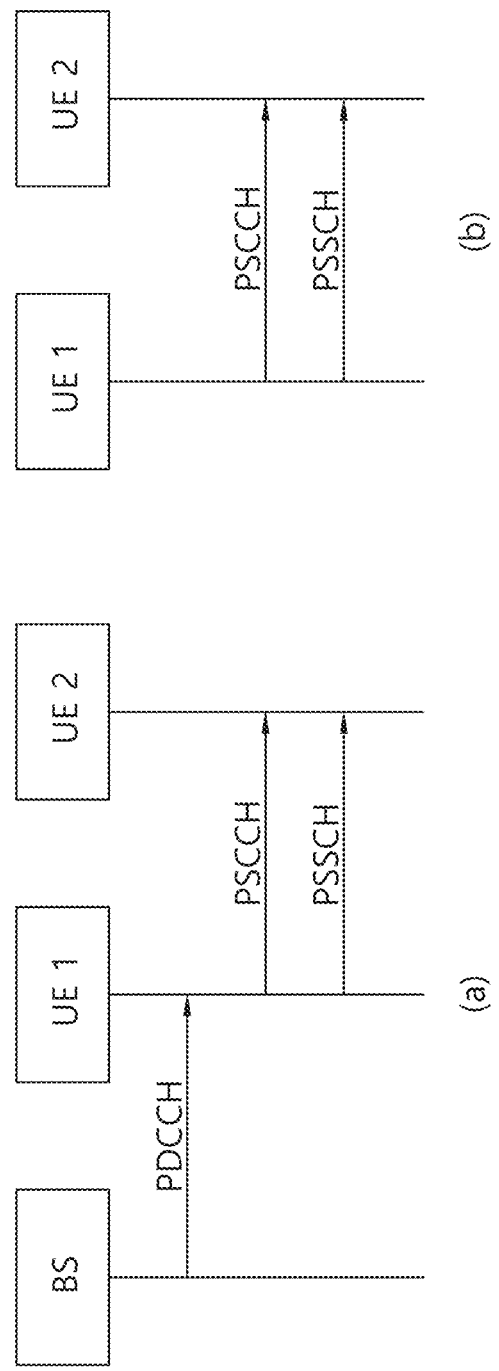
FIG. 16 shows a procedure of performing V2X or SL communication by a UE based on a transmission mode, based on an embodiment of the present disclosure.

FIG. 16 shows a procedure of performing V2X or SL communication by a UE based on a transmission mode, based on an embodiment of the present disclosure. The embodiment of FIG. 16 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 16 shows a UE operation related to an LTE transmission mode 1 or an LTE transmission mode 3. Alternatively, for example, (a) of FIG. 16 shows a UE operation related to an NR resource allocation mode 1. For example, the LTE transmission mode 1 may be applied to general SL communication, and the LTE transmission mode 3 may be applied to V2X communication.

For example, (b) of FIG. 16 shows a UE operation related to an LTE transmission mode 2 or an LTE transmission mode 4. Alternatively, for example, (b) of FIG. 16 shows a UE operation related to an NR resource allocation mode 2.

Referring to (a) of FIG. 16, in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 16, in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 17:
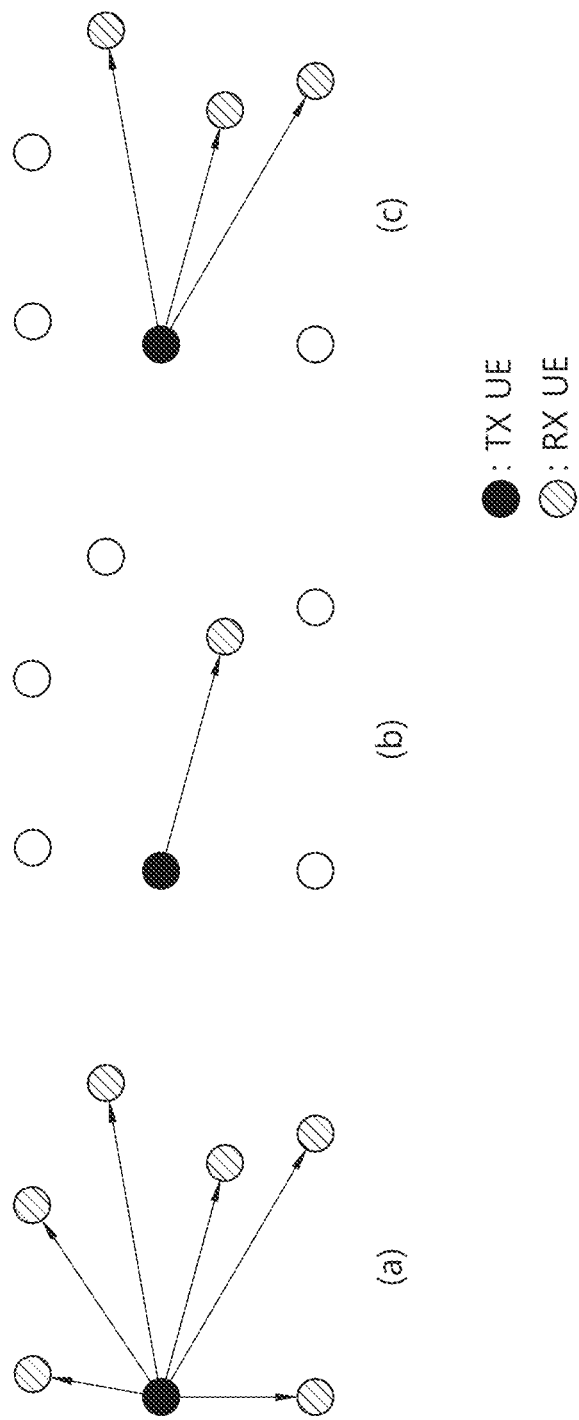
FIG. 17 shows three cast types, based on an embodiment of the present disclosure.

FIG. 17 shows three cast types, based on an embodiment of the present disclosure. The embodiment of FIG. 17 may be combined with various embodiments of the present disclosure. Specifically, (a) of FIG. 17 shows broadcast-type SL communication, (b) of FIG. 17 shows unicast type-SL communication, and (c) of FIG. 17 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 18:
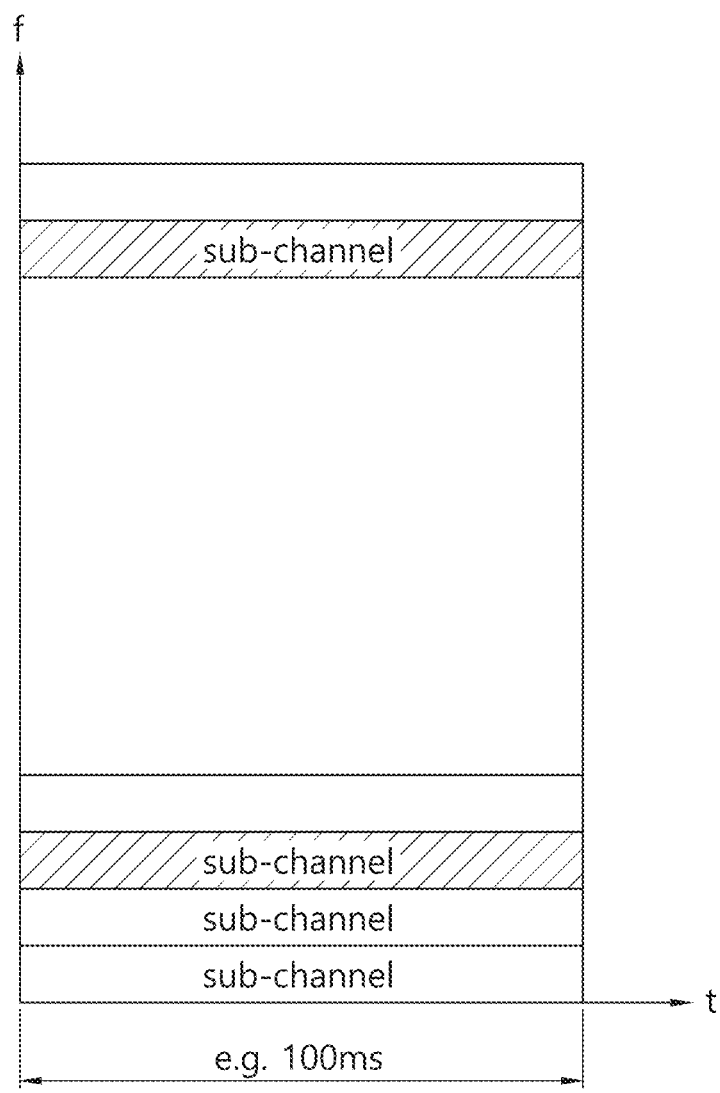
FIG. 18 shows a resource unit for CBR measurement, based on an embodiment of the present disclosure.

FIG. 18 shows a resource unit for CBR measurement, based on an embodiment of the present disclosure. The embodiment of FIG. 18 may be combined with various embodiments of the present disclosure.

Referring to FIG. 18, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 18, if it is assumed that a hatched sub-channel is a subchannel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an automatic gain control (AGC) duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/P S SCH.

Hereinafter, physical layer processing will be described.

Based on an embodiment of the present disclosure, a data unit may be a target of physical layer processing in a transmitting side before being transmitted through a radio interface. Based on an embodiment of the present disclosure, a radio signal carrying the data unit may be a target of physical layer processing in a receiving side.

Figure 19:
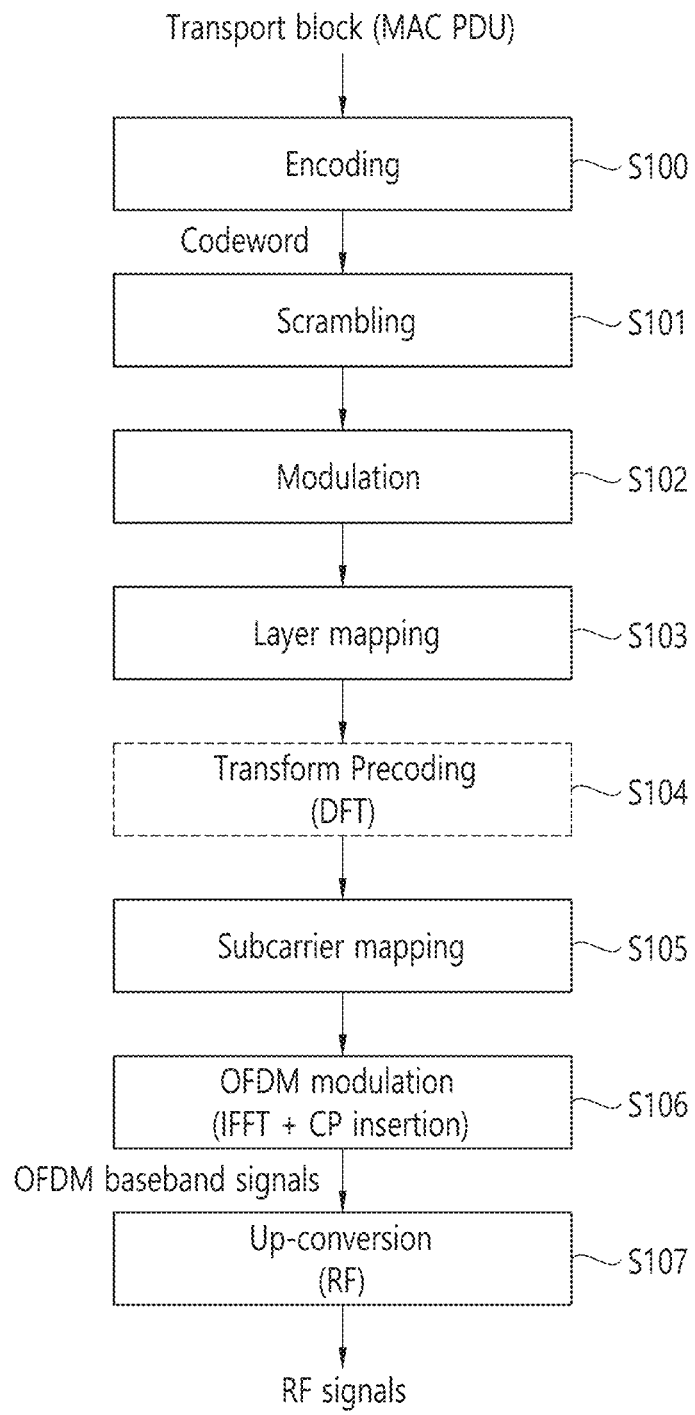
FIG. 19 shows physical layer processing of a transmitting side based on an embodiment of the present disclosure.

FIG. 19 shows physical layer processing of a transmitting side based on an embodiment of the present disclosure. The embodiment of FIG. 19 may be combined with various embodiments of the present disclosure.

Table 5 may show a mapping relation between an uplink transport channel and a physical channel, and Table 6 may show a mapping relation between uplink control channel information and the physical channel.

TABLE 5

| Transport channel | Physical channel |
| --- | --- |
| Uplink-Shared Channel (UL-SCH) | Physical Uplink Shared Channel (PUSCH) |
| Random Access Channel (RACH) | Physical Random Access Channel (PRACH) |

TABLE 6

| Control information | Physical channel |
| --- | --- |
| Uplink Control Information (UCI) | Physical Uplink Control Channel (PUCCH) Physical Uplink Shared Channel (PUSCH) |

Table 7 may show a mapping relation between a downlink transport channel and a physical channel, and Table 8 may show a mapping relation between downlink control channel information and the physical channel.

TABLE 7

| Transport channel | Physical channel |
| --- | --- |
| Downlink-Shared Channel (DL-SCH) | Physical Downlink Shared Channel (PDSCH) |
| Broadcast Channel (BCH) | Physical Broadcast Channel (PBCH) |
| Paging Channel (PCH) | Physical Downlink Shared Channel (PDSCH) |

TABLE 8

| Control information | Physical channel |
| --- | --- |
| Downlink Control Information (DCI) | Physical Downlink Control Channel (PDCCH) |

Table 9 may show a mapping relation between an SL transport channel and a physical channel, and Table 10 may show a mapping relation between SL control channel information and the physical channel.

TABLE 9

| Transport channel | Physical channel |
| --- | --- |
| Sidelink-Shared Channel (SL-SCH) | Physical Sidelink Shared Channel (PSSCH) |
| Sidelink-Broadcast Channel (SL-BCH) | Physical Sidelink Broadcast Channel (PSBCH) |

TABLE 10

| Control information | Physical channel |
| --- | --- |
| Sidelink Control Information (SCI) | Physical Sidelink Control Channel (PSCCH) |

Referring to FIG. 19, in step S100, the transmitting side may perform encoding on a transport block (TB). Data and control streams from the MAC layer are encoded so that the PHY layer provides transport and control services through a radio transmission link. For example, the TB from the MAC layer may be encoded into a codeword in the transmitting side. A channel coding scheme may be a combination of error detection, error correcting, rate matching, interleaving, and a transport channel or control information splitting from the physical channel. Alternatively, the channel coding scheme may be a combination of error detection, error correcting, rate matching, interleaving, and a transport channel or control information mapping onto the physical channel.

In an NR system, a channel coding scheme described below may be used for a different type of a transport channel and a different type of control information. For example, a channel coding scheme per transport channel type may be as shown in Table 11. For example, a channel coding scheme per control information type may be as shown in Table 12.

TABLE 11

| Transport channel | Channel coding scheme |
| --- | --- |
| UL-SCH | LDPC(Low Density Parity Check) |
| DL-SCH | |
| SL-SCH | |
| PCH | |
| BCH | Polar code |
| SL-BCH | |

TABLE 12

| Control information | Channel coding scheme |
| --- | --- |
| DCI | Polar code |
| SCI | |
| UCI | Block code, Polar code |

For example, a polar code may be applied to the PSCCH. For example, an LDPC code may be applied to a TB transmitted through the PSSCH.

For transmission of TB (e.g., MAC PDU), the transmitting side may attach a cyclic redundancy check (CRC) sequence to the TB. Therefore, the transmitting side may provide error detection for a receiving side. In SL communication, the transmitting side may be a transmitting UE, and the receiving side may be a receiving UE. In an NR system, a communication device may use an LDPC code in encoding/decoding of UL-SCH and DL-SCH or the like. The NR system may support two LDPC base graphs (i.e., two LDPC base matrixes). The two LDCP base graphs may be an LDPC base graph 1 optimized for a small TB and an LDPC base graph optimized for a great TB. The transmitting side may select the LDPC base graph 1 or 2 based on a TB size and a coding rate R. The coding rate may be indicated by a modulation coding scheme (MCS) index I_MCS. The MCS index may be provided dynamically to the UE by a PDCCH which schedules a PUSCH or a PDSCH. Alternatively, the MCS index may be provided dynamically to the UE by a PDCCH which (re)initializes or activates a UL configured grant 2 or DL SPS. The MCS index may be provided to the UE by RRC signaling related to a UL configured grant type 1. If the CRC-attached TB is greater than a maximum code block size for the selected LDPC base graph, the transmitting side may split the CRC-attached TB into a plurality of code blocks. In addition, the transmitting side may attach an additional CRC sequence to each code block. Maximum code block sizes for the LDPC base graph 1 and LDPC base graph 2 may be respectively 8448 bits and 3480 bits. If the CRC-attached TB is not greater than the maximum code block size for the selected LDPC base graph, the transmitting side may encode the CRC-attached TB based on the selected LDPC base graph. The transmitting side may encode each code block of the TB based on the selected LDPC basic graph. In addition, the LDPC coded blocks may be individually rate matched. A code block link may be performed to generate a codeword for transmission on a PDSCH or a PUSCH. For the PDSCH, up to two codewords (i.e., up to two TBs) may be simultaneously transmitted on the PDSCH. The PUSCH may be used in transmission of UL-SCH data and layer-1 and/or 2 control information. Although not shown in FIG. 19, the layer-1 and/or 2 control information may be multiplexed with a codeword for UL-SCH data.

In steps S101 and S102, the transmitting side may perform scrambling and modulation on the codeword. Bits of the codeword may be scrambled and modulated to generate a block of a complex-valued modulation symbol.

In step S103, the transmitting side may perform layer mapping. Complex-valued modulation symbols of the codeword may be mapped to one or more multiple input multiple output (MIMO) layers. The codeword may be mapped to up to four layers. The PDSCH may carry two codewords, and thus the PDSCH may support up to 8-layer transmission. The PUSCH may support a single codeword, and thus the PUSCH may support up to 4-layer transmission.

In step S104, the transmitting side may perform precoding transform. A downlink transmission waveform may be normal orthogonal frequency division multiplexing (OFDM) which uses cyclic prefix (CP). For downlink, transform precoding (i.e., discrete Fourier transform (DFT)) may not be applied.

An uplink transmission waveform may be conventional OFDM using CP having a transform precoding function performing DFT spreading which can be disabled or enabled. In an NR system, for uplink, if enabled, the transform precoding may be selectively applied. The transform precoding may be spreading of uplink data in a specific manner to decrease a peak-to-average power ratio (PAPR) of a waveform. The transform precoding may be one type of DFT. That is, the NR system may support two options for an uplink waveform. One may be CP-OFDM (identical to DL waveform), and the other may be DFT-s-OFDM. Whether the UE shall use CP-OFDM or DFT-s-OFDM may be determined by the BS through an RRC parameter.

In step S105, the transmitting side may perform subcarrier mapping. A layer may be mapped to an antenna port. In downlink, for layer-to-antenna port mapping, transparent manner (non-codebook-based) mapping may be supported, and how to perform beamforming or MIMO precoding may be transparent to the UE. In uplink, for layer-to-antenna port mapping, non-codebook-based mapping and codebook-based mapping may be both supported.

For each antenna port (i.e., layer) used in transmission of a physical channel (e.g., PDSCH, PUSCH, PSSCH), the transmitting side may map complex-valued modulation symbols to a subcarrier in a resource block allocated to a physical channel.

In step S106, the transmitting side may perform OFDM modulation. A communication device of the transmitting side may add CP and perform inverse fast Fourier transform (IFFT), thereby generating a time-continuous OFDM baseband signal on an antenna port p and a subcarrier spacing configuration u for an OFDM symbol 1 within TTI for the physical channel. For example, for each OFDM symbol, the communication device of the transmitting side may perform IFFT on a complex-valued modulation symbol mapped to a resource block of a corresponding OFDM symbol. In addition, the communication device of the transmitting side may add CP to a signal to which IFFT is performed to generate an OFDM baseband signal.

In step S107, the transmitting side may perform up-conversion. The communication device of the transmitting side may up-convert the subcarrier spacing configuration u, the OFDM symbol 1, and the OFDM baseband signal for the antenna port p, to a carrier frequency f0 of a cell to which the physical channel is allocated.

The processor 102 and/or 202 of the present disclosure may be configured to perform encoding, scrambling, modulation, layer mapping, precoding conversion (for uplink), subcarrier mapping, and OFDM modulation.

Figure 20:
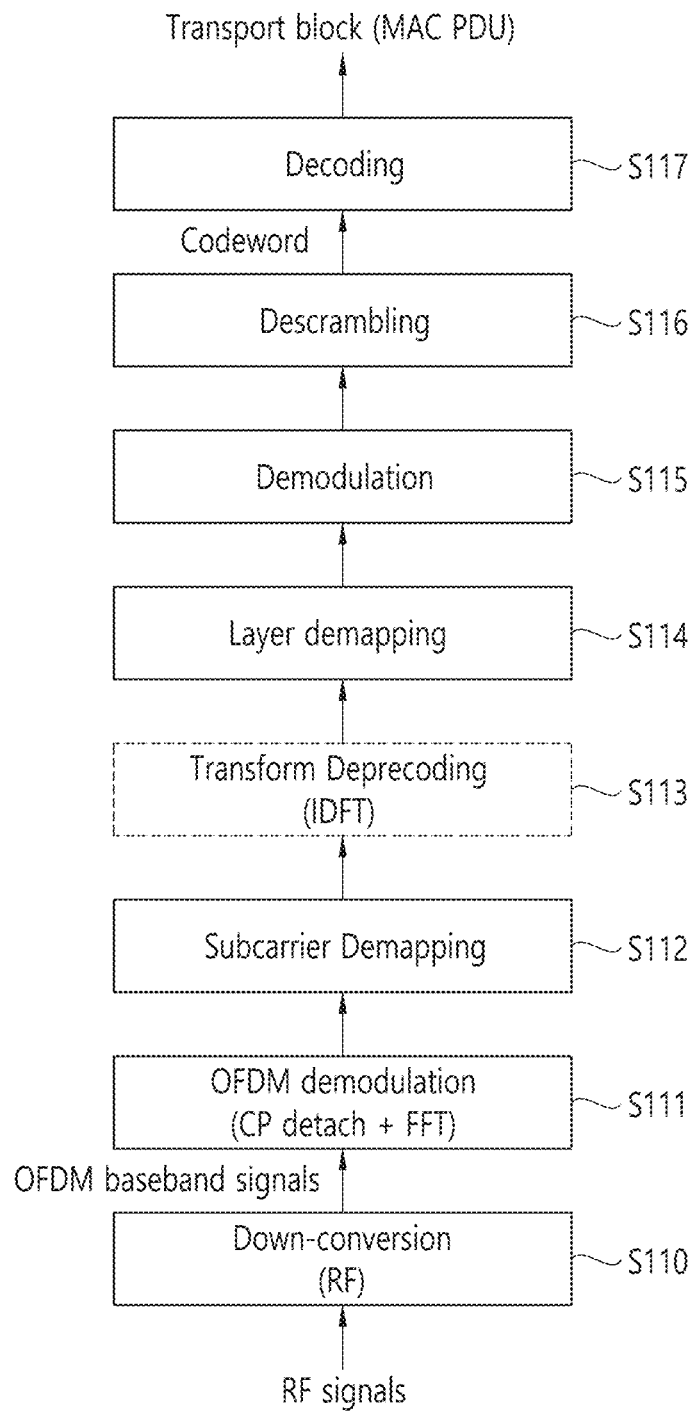
FIG. 20 shows physical layer processing of a receiving side based on an embodiment of the present disclosure.

FIG. 20 shows physical layer processing of a receiving side based on an embodiment of the present disclosure. The embodiment of FIG. 20 may be combined with various embodiments of the present disclosure.

The physical layer processing of the receiving side may be inverse processing of physical layer processing of a transmitting side.

In step S110, the receiving side may perform frequency down-conversion. A communication device of the receiving side may receive an RF signal of a carrier frequency through an antenna. Transceivers 106 and/or 206 for receiving an RF signal at a carrier frequency may down-convert a carrier frequency of the RF signal into a baseband to obtain an OFDM baseband signal.

In step S111, the receiving side may perform OFDM demodulation. The communication device of the receiving side may obtain a complex-valued modulation symbol through CP detachment and fast Fourier transform (FFT). For example, for each OFDM symbol, the communication device of the receiving side may remove CP from the OFDM baseband signal. In addition, the communication device of the receiving side may perform FFT on the CP-removed OFDM baseband signal to obtain a complex-valued modulation symbol for an antenna port p, a subcarrier spacing u, and an OFDM symbol 1.

In step S112, the receiving side may perform subcarrier demapping. In order to obtain a complex-valued modulation symbol of a corresponding physical channel, the subcarrier demapping may be performed on the complex-valued modulation symbol. For example, a processor of a UE may obtain a complex-valued modulation symbol to be mapped to a subcarrier belonging to a PDSCH among complex-valued modulation symbols received in a bandwidth part (BWP).

In step S113, the receiving side may perform transform de-precoding. When transform precoding is enabled for an uplink physical channel, the transform de-precoding (e.g., inverse discrete Fourier transform (IDFT)) may be performed on a complex-valued modulation symbol of the uplink physical channel. For a downlink physical channel or a transform precoding-disabled uplink physical channel, the transform de-precoding may not be performed.

In step S114, the receiving side may perform layer demapping. The complex-valued modulation symbol may be demapped into one or two codewords.

In steps S115 and S116, the receiving side may perform demodulation and descrambling. A complex-valued modulation symbol of a codeword may be demodulated, and may be descrambled into bits of the codeword.

In step S117, the receiving side may perform decoding. The codeword may be decoded with TB. For UL-SCH and DL-SCH, an LDPC base graph 1 or 2 may be selected based on a TB size and a coding rate R. The codeword may include one or a plurality of coded blocks. Each coded block may be decoded into a CRC-attached code block or a CRC-attached TB based on the selected LDPC base graph. If code block segmentation is performed on the CRC-attached TB in a transmitting side, a CRC sequence may be removed from each of the CRC-attached code blocks to obtain code blocks. The code block may be linked to the CRC-attached TB. A TB CRC sequence may be removed from the CRC-attached TB, thereby obtaining the TB. The TB may be transferred to the MAC layer.

The processor 102 and/or 202 of the present disclosure may be configured to perform OFDM demodulation, subcarrier demapping, layer demapping, demodulation, descrambling, and decoding.

In the aforementioned physical layer processing of the transmitting/receiving side, time and frequency domain resources related to subcarrier mapping (e.g., an OFDM symbol, a subcarrier, a subcarrier frequency), OFDM modulation, and frequency up/down-conversion may be determined based on resource allocation (e.g., an uplink grant, downlink allocation).

Figure 21:
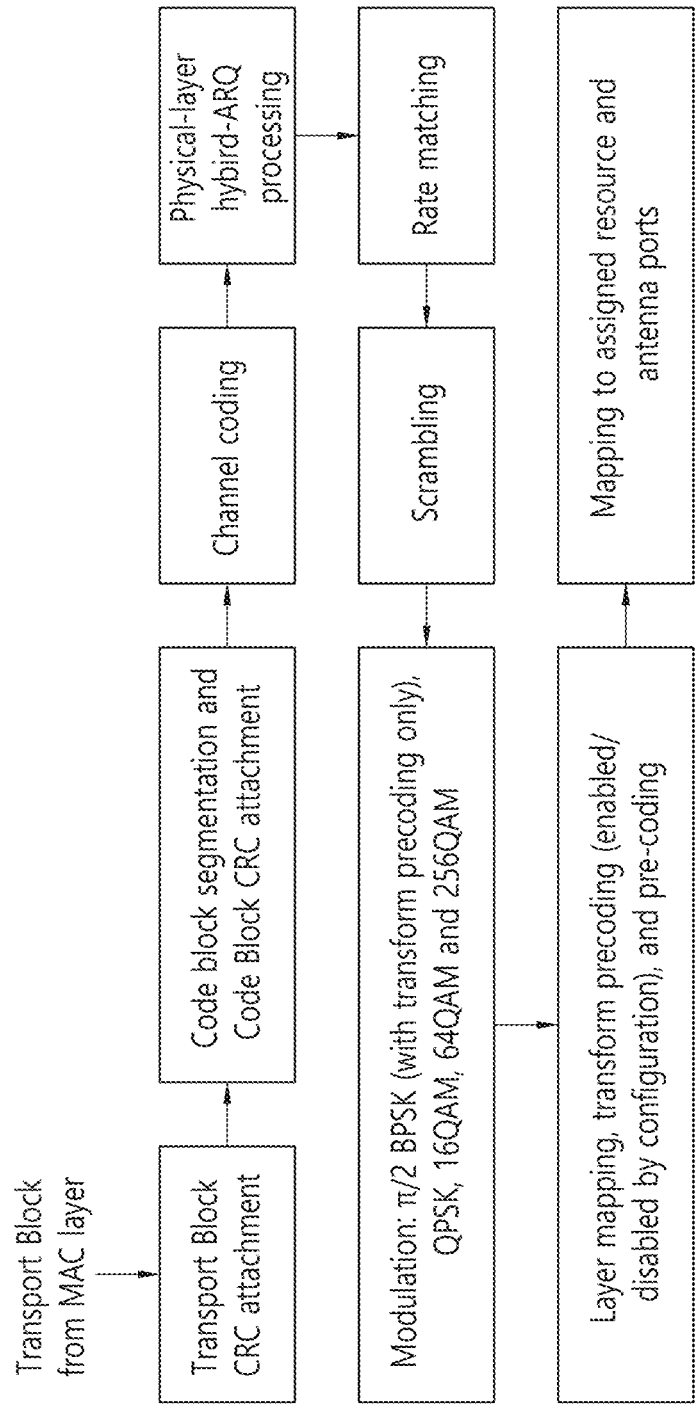
FIG. 21 shows physical layer processing for SL based on an embodiment of the present disclosure.

FIG. 21 shows physical layer processing for SL based on an embodiment of the present disclosure. The embodiment of FIG. 21 may be combined with various embodiments of the present disclosure.

A UE may split a long-length transport block (TB) into several short-length code blocks (CBs). In addition, the UE may perform a coding process on each of the plurality of short-length CBs, and thereafter may combine the plurality of short-length CBs into one. In addition, the UE may transmit the combined one CB to another UE.

Specifically, referring to FIG. 21, first, the UE may perform cyclic redundancy check (CRC) coding process on the long-length TB. The UE may attach the CRC to the TB. Thereafter, the UE may split a total-length CRC-attached TB into a plurality of short-length CBs. In addition, the UE may perform again the CRC coding process on each of the plurality of short-length CBs. The UE may attach the CRC to the CB. Therefore, each CB may include the CRC. In addition, each CRC-attached CB may be subjected to channel coding by being input to a channel encoder. Thereafter, the UE may perform rate matching, bit-unit scrambling, modulation, layer mapping, precoding, and antenna mapping on each CB, and the UE may transmit the result to a receiving end.

Additionally, a channel coding scheme described with reference to FIG. 19 and FIG. 20 may be applied to SL. For example, uplink/downlink physical channels and signals described with reference to FIG. 19 and FIG. 20 may be replaced with SL physical channels and signals. For example, channel coding defined for a data channel and control channel at NR Uu may be defined similarly to channel coding for the data channel and control channel on each NR SL.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) RSRP (and/or SL (L1) RSRQ and/or SL (L1) RSSI) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in the present disclosure, a high priority may mean a small priority value, and a low priority may mean a large priority value. For example, Table 13 shows an example of priorities.

TABLE 13

| service or logical channel | priority value |
| --- | --- |
| service A or logical channel A | 1 |
| service B or logical channel B | 2 |
| service C or logical channel C | 3 |

Referring to Table 13, for example, service A or logical channel A related to the smallest priority value may have the highest priority. For example, service C or logical channel C related to the largest priority value may have the lowest priority.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 22:
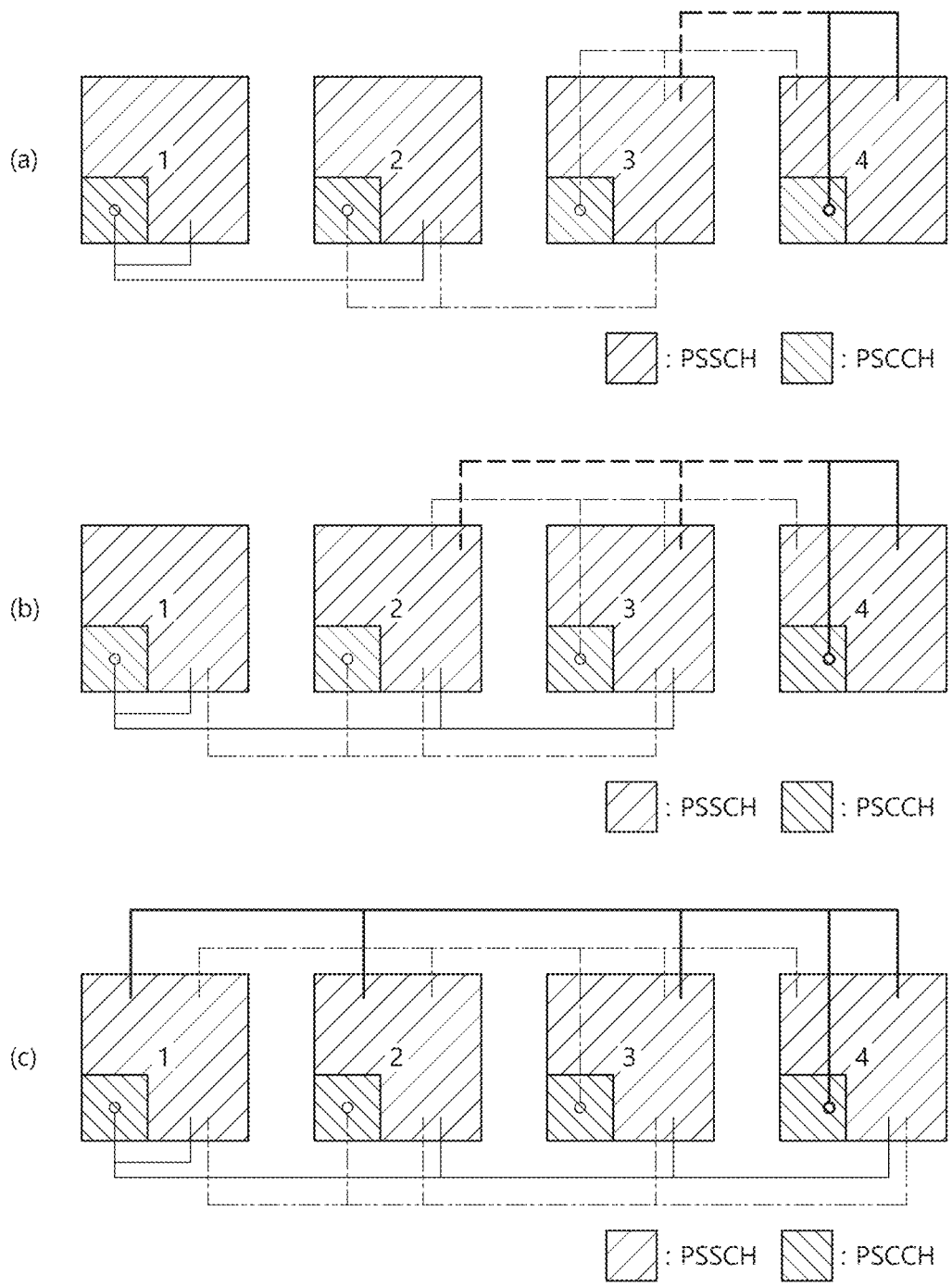
FIG. 22 shows a method in which a UE that has reserved transmission resource(s) informs another UE of the transmission resource(s), based on an embodiment of the present disclosure.

FIG. 22 shows a method in which a UE that has reserved transmission resource(s) informs another UE of the transmission resource(s), based on an embodiment of the present disclosure. The embodiment of FIG. 22 may be combined with various embodiments of the present disclosure.

Specifically, for example, (a) of FIG. 22 shows a method for performing by a transmitting UE chain-based resource reservation by transmitting/signaling location information of (maximum) 2 transmission resources to receiving UE(s) through one SCI, in the case of a value of K=4. For example, (b) of FIG. 22 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 22, the transmitting UE may transmit/signal only location information of the fourth transmission-related resource to the receiving UE(s) through the fourth (or last) transmission-related PSCCH. For example, referring to (a) of FIG. 22, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 22, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 22, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 22, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 22 shows a method for performing by the transmitting UE block-based resource reservation, by signaling location information of 4 transmission resources to receiving UE(s) through one SCI, in the case of a value of K=4.

Meanwhile, if a SL HARQ feedback operation is configured/applied to the UE performing SL communication, service-related requirements (e.g., reliability, error rate, etc.) may be efficiently satisfied. To this end, for example, the TX UE may transmit SL information through a PSSCH and/or a PSCCH, and the RX UE may transmit SL HARQ feedback information through a PSFCH. For example, the TX UE may transmit SL information to a target RX UE of the TX UE through the PSSCH and/or the PSCCH. For example, the RX UE may be a target RX UE of the TX UE. For example, the RX UE may transmit SL HARQ feedback information to the TX UE through the PSFCH. For example, the composition of the SL HARQ feedback information and/or the amount of the SL HARQ feedback information (e.g., the number of bits) transmitted by the RX UE through the PSFCH may be determined/defined based on some or all of the following schemes.

(1) Dynamic Codebook

For example, the composition of SL HARQ feedback information and/or the amount of SL HARQ feedback information transmitted by the RX UE through the PSFCH may be determined/defined based on a dynamic codebook. In this case, for example, based on the number of (new) TBs transmitted by the TX UE, the RX UE may change/determine the amount of SL HARQ feedback information to be transmitted. For example, based on the number of (new) TBs transmitted by the TX UE, the RX UE may change/determine the amount of SL HARQ feedback information to be transmitted to the TX UE.

For example, if the RX UE fails to decode a PSCCH, for example, if the RX UE fails to decode the PSCCH transmitted by the TX UE, the TX UE should perform blind decoding for the amount of SL HARQ feedback information transmitted by the RX UE through the PSFCH and/or the PSFCH resource used by the RX UE for transmission of SL HARQ feedback information. For example, based on the amount of SL HARQ feedback information transmitted by the RX UE, the RX UE may generate/transmit SL HARQ feedback information by using phase values the number of different cyclic shifts (CSs) related to a zadoff-chu (ZC) sequence. For example, if the SL HARQ feedback information transmitted by the RX UE is 1 bit, the RX UE may generate/transmit the SL HARQ feedback information by using 2 CS values. For example, if the SL HARQ feedback information transmitted by the RX UE is 2 bits, the RX UE may generate/transmit the SL HARQ feedback information by using 4 CS values. For example, if the TX UE transmits 3 TBs to the RX UE and the RX UE fails to decode a PSCCH related to 1 TB, the RX UE may transmit 2-bit HARQ feedback information to the TX UE. In this case, the TX UE expecting to receive 3-bit HARQ feedback information should perform blind decoding for the HARQ feedback information.

Herein, for example, in order to alleviate the problem that the TX UE performs blind decoding for the amount of SL HARQ feedback information transmitted by the RX UE through the PSFCH and/or the PSFCH resource used by the RX UE for transmission of SL HARQ feedback information, the TX UE may transmit, to the RX UE, a SCI including an indicator field indicating how many times (new) TB transmission the TX UE has performed to the RX UE. For example, the SCI may be a $2^{nd}$ SCI.

(2) (Semi) Static Codebook

For example, the composition of SL HARQ feedback information and/or the amount of SL HARQ feedback information transmitted by the RX UE through the PSFCH may be determined/defined based on a (semi) static codebook.

For example, the number of slots of a PSSCH resource related to a PSFCH resource and/or the number of slots of a PSCCH resource related to the PSFCH resource may be configured or pre-configured for the UE. For example, the number of slots of the PSSCH resource related to the PSFCH resource and/or the number of slots of the PSCCH resource related to the PSFCH resource may be configured or pre-configured for the UE for each resource pool.

For example, the location of a PSSCH resource related to a PSFCH resource and/or the location of a PSCCH resource related to the PSFCH resource may be configured or pre-configured for the UE. For example, the location of the PSSCH resource related to the PSFCH resource and/or the location of the PSCCH resource related to the PSFCH resource may be configured or pre-configured for the UE for each resource pool.

For example, an index of a PSSCH resource related to a PSFCH resource and/or an index of a PSCCH resource related to the PSFCH resource may be configured or pre-configured for the UE. For example, the index of the PSSCH resource related to the PSFCH resource and/or the index of the PSCCH resource related to the PSFCH resource may be configured or pre-configured for the UE for each resource pool.

For example, based on at least one of the number of slots of the PSSCH resource related to the PSFCH resource, the number of slots of the PSCCH resource related to the PSFCH resource, the location of the PSSCH resource related to the PSFCH resource, the location of the PSCCH resource related to the PSFCH resource, the index of the PSSCH resource related to the PSFCH resource and/or the index of the PSCCH resource related to the PSFCH resource, the UE may determine the amount of SL HARQ feedback information included in the PSFCH.

For example, the RX UE may preferentially include feedback information related to a PSSCH slot and/or a PSCCH slot with a relatively low index (prior to a PSFCH slot) in SL HARQ feedback information (on a specific PSFCH) sequentially. For example, the RX UE may preferentially include feedback information related to a PSSCH slot and/or a PSCCH slot with a relatively high index (prior to a PSFCH slot) in SL HARQ feedback information (on a specific PSFCH) sequentially. For example, the RX UE may preferentially include feedback information related to a PSSCH slot and/or a PSCCH slot with a pre-configured index (prior to a PSFCH slot) in SL HARQ feedback information (on a specific PSFCH) sequentially. In addition, for example, the RX UE may transmit the SL HARQ feedback information to the TX UE through the specific PSFCH.

Meanwhile, for example, due to inaccuracy of the sensing operation performed by the TX UE, PSCCH resources selected by different TX UEs may overlap partially or entirely. For example, due to inaccuracy of the sensing operation due to a hidden node problem, etc., PSCCH resources selected by different TX UEs may overlap partially or entirely. For example, the PSCCH resource may include a resource for the TX UE to transmit a PSCCH and/or a resource for the RX UE to receive a PSCCH.

In the above-mentioned case, for example, in order to minimize the interference effect on channel estimation (of the RX UE), the TX UE may select one from a plurality of pre-configured PSCCH DMRS Orthogonal Cover Codes (OCCs) and/or a plurality of pre-configured PSCCH DMRS sequences. In addition, for example, the TX UE may transmit a PSCCH DMRS to the RX UE based on the selected PSCCH DMRS OCC and/or PSCCH DMRS sequence. For convenience of description, a plurality of pre-configured PSCCH DMRS orthogonal cover codes (OCCs) and/or a plurality of pre-configured PSCCH DMRS sequences may be referred to as CANDI_VAL. For example, the PSCCH DMRS may be a DMRS transmitted on a PSCCH. For example, the PSCCH DMRS OCC may be an orthogonal cover code applied to a DMRS transmitted on the PSCCH. For example, the PSCCH DMRS sequence may be a DMRS sequence transmitted on the PSCCH.

Hereinafter, based on various embodiments of the present disclosure, a method for a TX UE to transmit a PSCCH DMRS and an apparatus supporting the same will be described. For example, based on various embodiments of the present disclosure, CANDI_VAL may be configured or defined for the TX UE. For example, different CANDI_VAL may be mutually orthogonal or pseudo-orthogonal. For example, the OCC may include OCC in the frequency domain (hereinafter, FD-OCC) and/or OCC in the time domain (hereinafter, TD-OCC). For example, FD-OCC and TD-OCC may be replaced/substituted with each other. For example, RB and PRB may be replaced/substituted with each other.

For convenience of description, for example, in the case of a PSCCH, it is assumed that L DMRS REs exist per a PRB and per a symbol. For example, L may be a positive integer. For example, L may be 3. For example, L may be the same value as N described below. For example, the DMRS RE may be an RE to which the TX UE maps/transmits a DMRS.

Based on an embodiment of the present disclosure, if REM_VAL is a positive integer, the TX UE may not apply/perform FD-OCC to REM_VAL PSCCH DMRS REs. For example, the TX UE may obtain/calculate REM_VAL based on Equation 1.

$$\text{REM\_VAL} = (\text{the number of PSCCH PRBs} \times N) \, \text{MOD} \, (\text{the length of FD-OCC}) \quad \text{[Equation 1]}$$

Herein, for example, $Z=(X) \, \text{MOD} \, (Y)$ may be a function deriving the remainder of dividing X by Y. For example, the number of PSCCH PRBs may be the number of PRBs used by the TX UE to transmit the PSCCH. For example, N may be a positive integer. For example, N may have the same value as L. For example, the length of the FD-OCC may be pre-configured for the TX UE.

For example, if REM_VAL obtained by the TX UE based on Equation 1 on the PSCCH symbol is a positive integer, that is, if REM_VAL is not zero, the TX UE may not apply FD-OCC to REM_VAL PSCCH DMRS REs.

For example, if REM_VAL obtained by the TX UE based on Equation 1 on the PSCCH symbol is a positive integer, that is, if REM_VAL is not zero, the TX UE may apply a pre-configured value to REM_VAL PSCCH DMRS REs. For example, if REM_VAL obtained by the TX UE based on Equation 1 on the PSCCH symbol is a positive integer, that is, if REM_VAL is not zero, the TX UE may apply a pre-configured FD-OCC value to REM_VAL PSCCH DMRS REs.

For example, if REM_VAL obtained by the TX UE based on Equation 1 on the PSCCH symbol is a positive integer, that is, if REM_VAL is not zero, the TX UE may apply only a part of FD-OCC related to the length of REM_VAL to REM_VAL PSCCH DMRS REs. For example, if REM_VAL obtained by the TX UE based on Equation 1 on the PSCCH symbol is a positive integer, that is, if REM_VAL is not zero, the TX UE may apply truncated FD-OCC to REM_VAL PSCCH DMRS REs. For example, the part of FD-OCC or the truncated FD-OCC may be REM_VAL FD-OCCs from the front among all FD-OCC. For example, the part of FD-OCC or the truncated FD-OCC may be REM_VAL FD-OCCs from the rear among all FD-OCC.

For example, if REM_VAL obtained by the TX UE based on Equation 1 on the PSCCH symbol is a positive integer, that is, if REM_VAL is not zero, the TX UE may apply (pre-configured) FD-OCC with REM_VAL length to REM_VAL PSCCH DMRS REs. For example, the number of PSCCH resources may be limited to the number of PRBs for which REM_VAL is zero. For example, the number of PRBs included in the PSCCH may be an even number. For example, the TX UE may configure/determine a PSCCH resource including K PRBs, and the TX UE may set/determine the K value such that REM_VAL is zero. For example, the network/base station may configure or pre-configure a PSCCH resource including K PRBs for the TX UE, and the network/base station may set/determine the K value such that REM_VAL is zero.

For example, the length of FD-OCC may be limited to a value for which REM_VAL is zero. For example, the length of FD-OCC may be limited to the number of PSCCH PRBs×the divisor of N values. For example, the length of the FD-OCC may be limited to the number of PSCCH PRBs× the greatest common divisor of N values. For example, the TX UE may configure/determine the length of FD-OCC such that REM_VAL is zero. For example, the network/base station may configure or pre-configure the length of FD-OCC for the TX UE such that REM_VAL is zero.

In this case, for example, one ID value used for PSCCH DMRS sequence generation and/or initialization may be configured for the TX UE. For example, one ID value used for PSCCH DMRS sequence generation and/or initialization may be configured for the TX UE specifically for a resource pool. For example, the TX UE may generate and/or initialize a PSCCH DMRS sequence by using the one ID value.

Based on an embodiment of the present disclosure, the TX UE may apply FD-OCC in the unit of pre-configured M PSCCH PRBs (on PSCCH symbols). For example, M may be a positive integer. For example, M may be 2. For example, the number of FD-OCC applied to M PSCCH PRBs may be M, and the length of FD-OCC may be N. For example, N may be a positive integer. For example, N may have the same value as L. In this case, for example, the TX UE may apply FD-OCC with length N to each PRB (included in M PSCCH PRBs). Also, in this case, for example, the number of UEs that can be multiplexed ((pseudo) orthogonally) on M PRBs may be a total of M×M. In this case, for example, one ID value used for PSCCH DMRS sequence generation and/or initialization may be configured for the TX UE. For example, for example, one ID value used for PSCCH DMRS sequence generation and/or initialization may be configured for the TX UE specifically for a resource pool. For example, the TX UE may generate and/or initialize a PSCCH DMRS sequence by using the one ID value.

Based on an embodiment of the present disclosure, the TX UE may randomly select one from among (pre-configured) M ID values used for PSCCH DMRS sequence generation and/or initialization (on PSCCH symbols). And/or, for example, the TX UE may randomly select one from among M PSCCH DMRS RE SHIFT values (on the frequency axis). For example, M may be a positive integer. For example, M may be 2. In addition, for example, the TX UE may randomly select one from among (pre-configured) N FD-OCCs. For example, N FD-OCCs may refer to FD-OCC with length N. For example, N may be a positive integer. For example, N may have the same value as L.

For example, the TX UE may generate/define a PSCCH DMRS based on at least one of the selected ID value, the selected PSCCH DMRS RE SHIFT value, and/or the selected FD-OCC. For example, the TX UE may generate/define a PSCCH DMRS by combining at least one of the selected ID value, the selected PSCCH DMRS RE SHIFT value, and/or the selected FD-OCC. In this case, for example, N (candidate) FD-OCCs (which are randomly selectable by the TX UE) may be configured for the TX UE for each ID value and/or PSCCH DMRS RE SHIFT value.

For example, the TX UE may receive M ID values from the base station/network through (pre-defined) signaling. For example, the base station/network may configure or pre-configure M ID values for the TX UE.

For example, the TX UE may obtain/derive M ID values by applying M−1 offset values to one pre-configured ID value. For example, the TX UE may receive one ID value from the base station/network through (pre-defined) signaling. For example, the base station/network may configure or pre-configure one ID value for the TX UE. For example, M−1 offset values may be pre-defined for the TX UE. For example, the (pre-defined) signaling may include SIB and/or RRC signaling.

For example, the TX UE may receive M PSCCH DMRS RE SHIFT values from the base station/network through (pre-defined) signaling. For example, the base station/network may configure or pre-configure M PSCCH DMRS RE SHIFT values for the TX UE.

For example, the TX UE may obtain/derive M PSCCH DMRS RE SHIFT values by applying M−1 offset values to one pre-configured PSCCH DMRS RE SHIFT value. For example, the TX UE may receive one PSCCH DMRS RE SHIFT value from the base station/network through (pre-defined) signaling. For example, the base station/network may configure or pre-configure one PSCCH DMRS RE SHIFT value for the TX UE. For example, M−1 offset values may be pre-defined for the TX UE. For example, the (pre-defined) signaling may include SIB and/or RRC signaling.

In this case, for example, the number of UEs that can be multiplexed ((pseudo) orthogonally) on one PSCCH PRB may be a total of $N^M$.

Based on an embodiment of the present disclosure, W PSCCH symbols may be configured for the TX UE (in a resource pool). In this case, for example, the TX UE may randomly select one from among (pre-configured) N FD-OCCs. For example, N FD-OCCs may refer to FD-OCC with length N. For example, N may be a positive integer. For example, N may have the same value as L. For example, the TX UE may randomly select one from among (pre-configured) W TD-OCCs. For example, W TD-OCCs may refer to TD-OCCs with length W.

For example, the TX UE may generate/define a PSCCH DMRS based on the selected TD-OCC and the selected FD-OCC. For example, the TX UE may generate/define the PSCCH DMRS by combining the selected TD-OCC and the selected FD-OCC. In this case, for example, the number of UEs that can be multiplexed ((pseudo) orthogonally) on a PSCCH resource including W symbols and one PRB may be a total of W×N.

Based on an embodiment of the present disclosure, FD-OCC with length N is used (on PSCCH symbols), and the number of FD-OCCs actually used may be designated/configured for the TX UE to be smaller than N. For example, FD-OCC with length N may refer to N FD-OCCs. In this case, the base station/network may configure at least one FD-OCC among N FD-OCCs for the TX UE. For example, the base station/network may configure at least one FD-OCC among N FD-OCCs for the TX UE specifically for a resource pool. In this case, for example, the TX UE may randomly select FD-OCC from among at least one FD-OCC, and the TX UE may apply the selected FD-OCC to the PSCCH DMRS.

Based on an embodiment of the present disclosure, a pre-coding resource block group (PRG) may be defined based on a sub-band with a pre-configured size (hereinafter, PRG_SIZE). For example, the PRG may be the unit of PRB to which the TX UE applies the same precoding. For example, if PRG is 2, the TX UE may apply the same precoding to two PRBs to perform sidelink transmission.

In this case, for example, the length of FD-OCC may be configured for the TX UE to be less than or equal to PRG_SIZE. For example, the length of FD-OCC may be configured for the TX UE to be (always) the same as PRG_SIZE. For example, the TX UE may not apply FD-OCC, across different PRGs to which different precoding may be assumed/applied. For example, it is assumed that PRG A includes PRB #1 and PRB #2, and it is assumed that PRG B includes PRB #3 and PRB #4. In this case, the TX UE may not apply FD-OCC across PRB #2 and PRB #3.

Based on the above-described various embodiments, the TX UE may generate the PSCCH DMRS. In addition, the TX UE may transmit the DMRS to the RX UE on the PSCCH.

Hereinafter, based on various embodiments of the present disclosure, a method for the TX UE to transmit control information through a PSSCH and an apparatus supporting the same will be described.

Based on an embodiment of the present disclosure, the TX UE may transmit a second SCI to the RX UE through a PSSCH. For example, the TX UE may piggyback the second SCI on the PSSCH and transmit it to the RX UE. For example, the TX UE may map the second SCI to the PSSCH resource and transmit it, based on the method proposed below. In this case, there is an advantage that the intended second SCI-related coding rate and/or (target) performance can always be guaranteed.

For example, the TX UE may determine/obtain the number of coded modulation symbols for the second SCI based on Equation 2. For example, the TX UE may determine/obtain the number of coded modulation symbols for each layer for the second SCI based on Equation 2. In the present disclosure, $y = \lceil x \rceil$ may be a function for obtaining the minimum integer greater than or equal to x.

$$Q'_{SCI2} = \min\left\{\left\lceil\frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r}\right\rceil, \left\lceil\alpha \sum_{l=0}^{N_{symbol}^{PSSCH}-1} M_{sc}^{SCI2}(l)\right\rceil\right\} + \gamma$$ [Equation 2]

Herein, for example, $O_{SCI2}$ may be the number of second SCI bits. For example, $L_{SCI2}$ may be the number of CRC bits for the second SCI. For example, $L_{SCI2}$ may be 24 bits. For example, $\beta^{SCI2}_{offset}$ may be a value indicated through 1$^{st}$ SCI related to the second SCI. For example, $\alpha$ may be a value configured or pre-configured for each resource pool. For example, $N^{PSSCH}_{symbol}$ may be the number of symbols allocated for the PSSCH. For example, the number of AGC-related symbols may be excluded from the number of symbols allocated for the PSSCH. For example, $M^{SCI2}_{sc}$ may be the number of REs that can be used for transmission of the second SCI. Herein, for example, REs to which a PSCCH is mapped may be excluded from the number of REs that can be used for transmission of the second SCI. And/or, for example, REs to which a PT-RS is mapped may be excluded from the number of REs that can be used for transmission of the second SCI. And/or, for example, REs to which a CSI-RS is mapped may be excluded from the number of REs that can be used for transmission of the second SCI. And/or, for example, REs to which a DM-RS is mapped may be excluded from the number of REs that can be used for transmission of the second SCI.

$$\min\left\{\left\lceil\frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r}\right\rceil,$$ [Equation 3]

-continued
$$\left\lceil\alpha \sum_{l=0}^{N_{symbol}^{PSSCH}-1} M_{sc}^{SCI2}(l)\right\rceil\right\}$$

For example, if the last RE to which the second SCI is mapped, obtained/derived based on Equation 3 by the TX UE, does not fill the RB (on the symbol), the TX UE may additionally map the second SCI to the remaining REs on the RB by using the gamma ($\gamma$) value of Equation 2. For example, if the last RE to which the second SCI is mapped, obtained/derived based on Equation 3 by the TX UE, does not fill the RB (on the symbol), the TX UE may map dummy information having the same modulation order as the second SCI to the remaining REs on the RB by using the gamma value of Equation 2. For example, if the last RE to which the second SCI is mapped, obtained/derived based on Equation 3 by the TX UE, does not fill the RB (on the symbol), the TX UE may repeatedly map some information of the second SCI to the remaining REs on the RB by using the gamma value of Equation 2.

For example, the $K_r$ value may be the r-th code block size for a SL-SCH of PSSCH transmission. Herein, for example, the $K_r$ value may be different from TBS and/or the size of a code block related to the PSSCH actually used. For example, since the TX UE can (actually) determine/derive the TBS and/or the size of the code block related to the PSSCH by excluding overhead due to at least one of a second SCI, a PSCCH, a SL CSI-RS, a PT-RS, and/or a DMRS, the $K_r$ value may be the r-th code block size for a SL-SCH of PSSCH transmission. That is, if the TX UE derives/determines the amount of resources and/or the number of REs to which the second SCI is mapped, based on the above equation, the overhead due to at least one of the second SCI, the PSCCH, the SL CSI-RS, the PT-RS, and/or the DMRS may not be considered in the $K_r$ value. For example, $C_{SL-SCH}$ may be the number of code blocks for the SL-SCH of PSSCH transmission.

Figure 23:
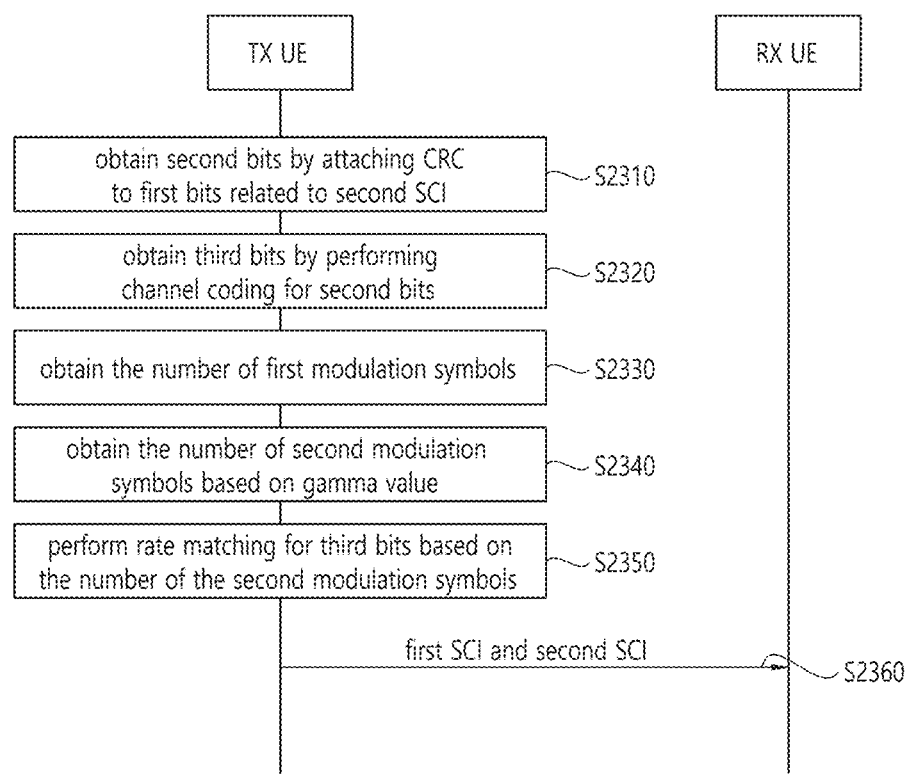
FIG. 23 shows a procedure for a TX UE to transmit control information, based on an embodiment of the present disclosure.

FIG. 23 shows a procedure for a TX UE to transmit control information, based on an embodiment of the present disclosure. The embodiment of FIG. 23 may be combined with various embodiments of the present disclosure.

Referring to FIG. 23, in step S2310, the TX UE may obtain second bits by attaching CRC to first bits related to the second SCI. In step S2320, the TX UE may obtain third bits by performing channel coding for the second bits. For example, the channel coding may be polar coding. In step S2330, the TX UE may obtain the number of first modulation symbols. For example, the TX UE may obtain the number of first modulation symbols based on Equation 4 or Equation 5.

[Equation 4]

The number of first modulation symbols =
$$\min\left\{\left\lceil\frac{(O_{SCI2} + L_{SCI2}) \cdot \beta_{offset}^{SCI2} \cdot \sum_{l=0}^{N_{symbol}^{PSSCH}-1} M_{sc}^{SCI2}(l)}{\sum_{r=0}^{C_{SL-SCH}-1} K_r}\right\rceil, \left\lceil\alpha \sum_{l=0}^{N_{symbol}^{PSSCH}-1} M_{sc}^{SCI2}(l)\right\rceil\right\}$$

-continued

[Equation 5]

The number of first modulation symbols =

$$\min\left\{\left\lceil\frac{(O_{SCI2}+L_{SCI2})\cdot\beta^{SCI2}_{offset}}{Q^{SCI2}_m\cdot R}\right\rceil,\left\lceil\alpha\sum_{l=0}^{N^{PSSCH}_{symbol}-1}M^{SCI2}_{sc}(l)\right\rceil\right\}$$

Herein, for example, $O_{SCI2}$ may be the number of second SCI bits. For example, $L_{SCI2}$ may be the number of CRC bits for the second SCI. For example, $L_{SCI2}$ may be 24 bits. For example, $\beta^{SCI}_{offset}$ may be a value indicated through $1^{st}$ SCI related to the second SCI. For example, a may be a value configured or pre-configured for each resource pool. For example, $N^{PSSCH}_{symbol}$ may be the number of symbols allocated for the PSSCH. For example, the number of AGC-related symbols may be excluded from the number of symbols allocated for the PSSCH. For example, $M^{SCI2}_{sc}$ may be the number of REs that can be used for transmission of the second SCI. Herein, for example, REs to which a PSCCH is mapped may be excluded from the number of REs that can be used for transmission of the second SCI. And/or, for example, REs to which a PT-RS is mapped may be excluded from the number of REs that can be used for transmission of the second SCI. And/or, for example, REs to which a CSI-RS is mapped may be excluded from the number of REs that can be used for transmission of the second SCI. And/or, for example, REs to which a DM-RS is mapped may be excluded from the number of REs that can be used for transmission of the second SCI. For example, $Q^{SCI}_m$ may be a modulation order of the second SCI. For example, R may be a coding rate indicated by the first SCI related to the second SCI.

For example, if the TX UE performs rate matching for the third bits based on the number of the first modulation symbols, modulation symbols related to the second SCI may not be mapped up to the last RE on the last symbol to which the modulation symbols in the RB is mapped. In this case, in order to fill REs on the last symbol to which the second SCI is mapped, in step S2340, the TX UE may obtain the number of second modulation symbols based on the gamma value. For example, the TX UE may obtain the number of second modulation symbols based on Equation 6 or Equation 7.

[Equation 6]

The number of second modulation symbols =

$$\min\left\{\left\lceil\frac{(O_{SCI2}+L_{SCI2})\cdot\beta^{SCI2}_{offset}\cdot\sum_{l=0}^{N^{PSSCH}_{symbol}-1}M^{SCI2}_{sc}(l)}{\sum_{r=0}^{C_{SL-SCH}-1}K_r}\right\rceil,\right.$$

$$\left.\left\lceil\alpha\sum_{l=0}^{N^{PSSCH}_{symbol}-1}M^{SCI2}_{sc}(l)\right\rceil\right\}+\gamma$$

[Equation 7]

The number of second modulation symbols =

$$\min\left\{\left\lceil\frac{(O_{SCI2}+L_{SCI2})\cdot\beta^{SCI2}_{offset}}{Q^{SCI2}_m\cdot R}\right\rceil,\left\lceil\alpha\sum_{l=0}^{N^{PSSCH}_{symbol}-1}M^{SCI2}_{sc}(l)\right\rceil\right\}+\gamma$$

Herein, the gamma value may be the number of vacant REs in the RB to which the last coded symbol of the second SCI belongs. For example, even though the TX UE performs rate matching for the third bits based on the number of the first modulation symbols, the modulation symbols related to the second SCI may be mapped by filling up to the last RE on the last symbol to which the modulation symbols in the RB is mapped. In this case, the gamma value may be zero.

In step S2350, the TX UE may perform rate matching for the third bits based on the number of the second modulation symbols. In this case, the modulation symbols of the second SCI may be mapped such that there is no empty RE on REs on a specific symbol within one RB. For example, a method for the TX UE to perform rate matching based on the gamma value will be described in detail with reference to FIGS. 24 to 29.

Figure 24:
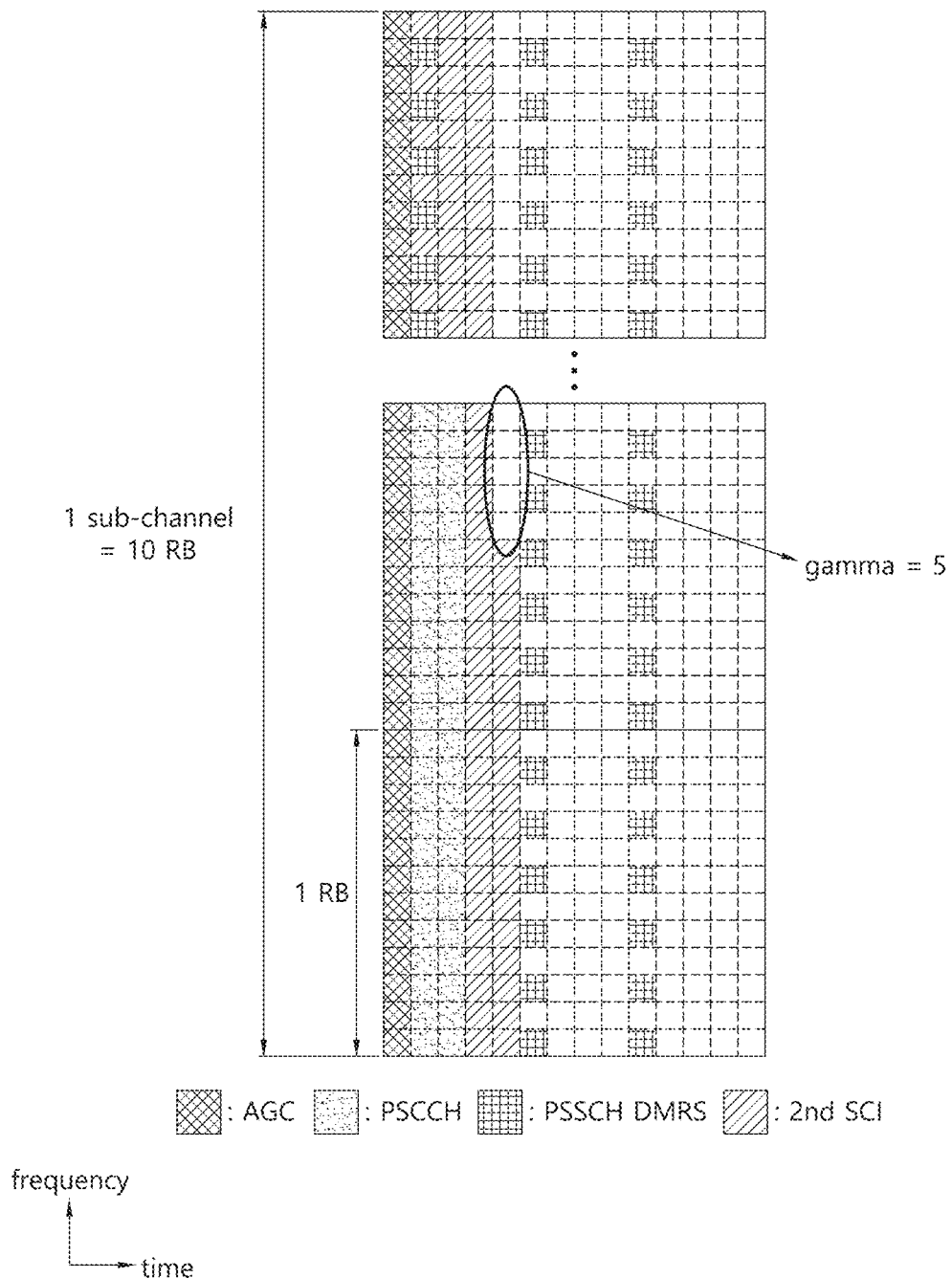
FIGS. 24 and 25 show a method for a TX UE to transmit a second SCI by rate matching the second SCI based on a gamma value, based on an embodiment of the present disclosure.
Figure 25:
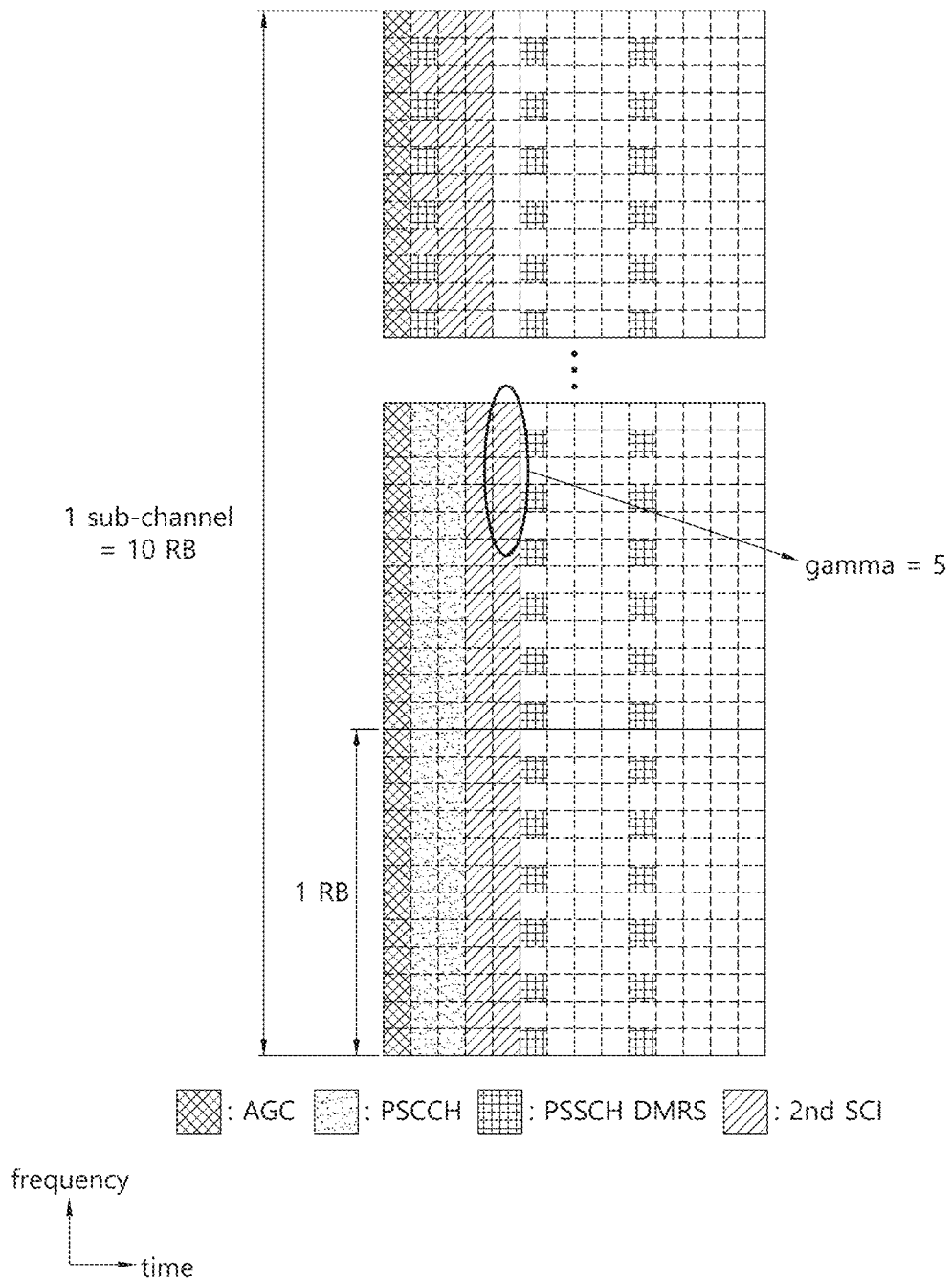

FIGS. 24 and 25 show a method for a TX UE to transmit a second SCI by rate matching the second SCI based on a gamma value, based on an embodiment of the present disclosure. The embodiments of FIGS. 24 and 25 may be combined with various embodiments of the present disclosure.

Referring to FIG. 24, if the TX UE rate-matches the second SCI based on the number of the first modulation symbols and transmits it, modulation symbols related to the second SCI may not be mapped to all REs on a specific symbol in one RB. In the embodiment of FIG. 24, if the TX UE rate-matches the second SCI based on the number of the first modulation symbols and transmits it, it is assumed that the modulation symbols related to the second SCI is not mapped to 5 REs on the 5th symbol. In this case, the TX UE may obtain the number of second modulation symbols by applying a gamma value of 5, and the TX UE may obtain modulation symbols based on the number of second modulation symbols. Therefore, referring to FIG. 25, if the TX UE rate-matches the second SCI based on the number of the second modulation symbols and transmits it, the modulation symbols related to the second SCI may be mapped to all REs on the specific symbol in one RB.

Figure 26:
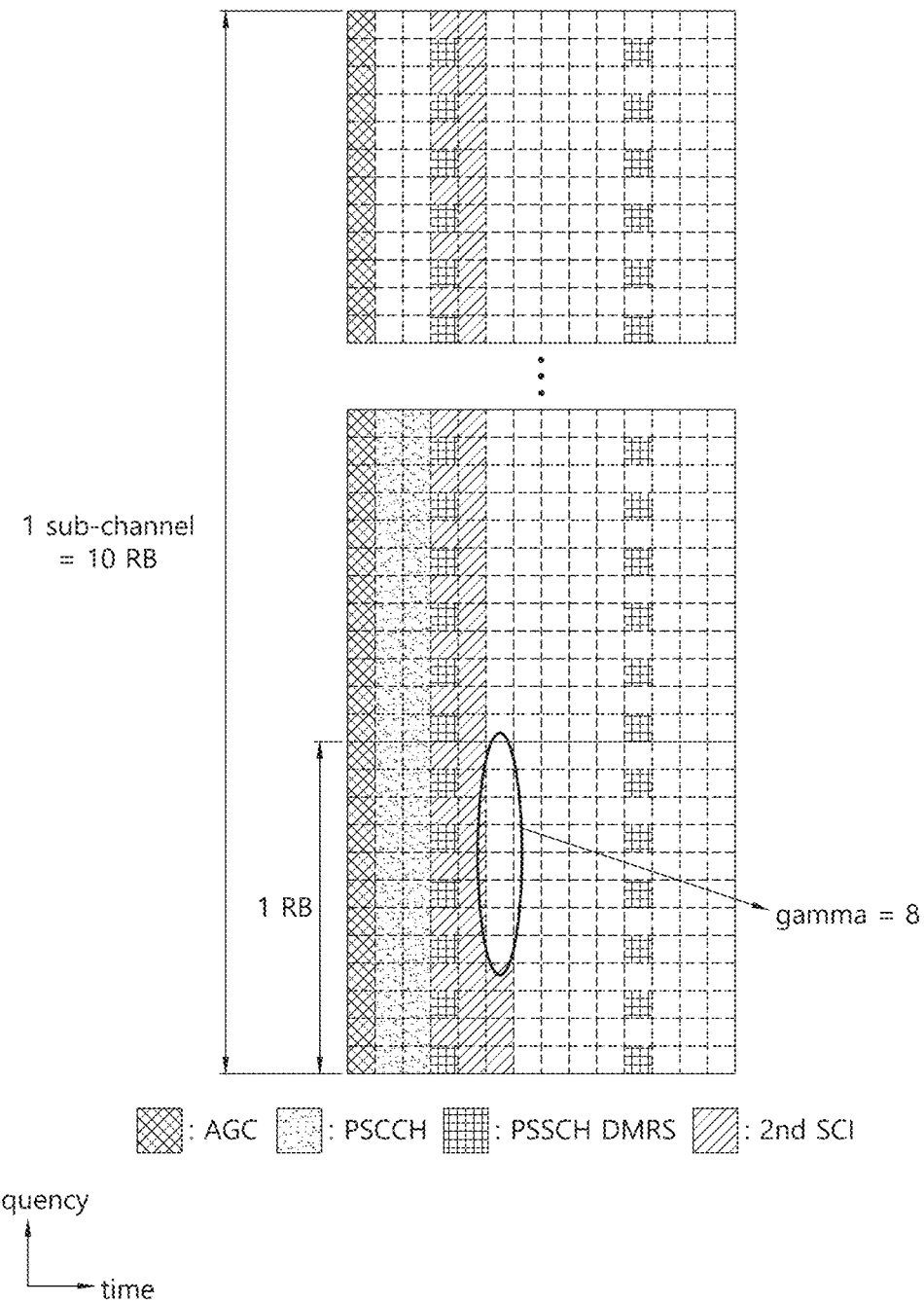
FIGS. 26 and 27 show a method for a TX UE to transmit a second SCI by rate matching the second SCI based on a gamma value, based on an embodiment of the present disclosure.
Figure 27:
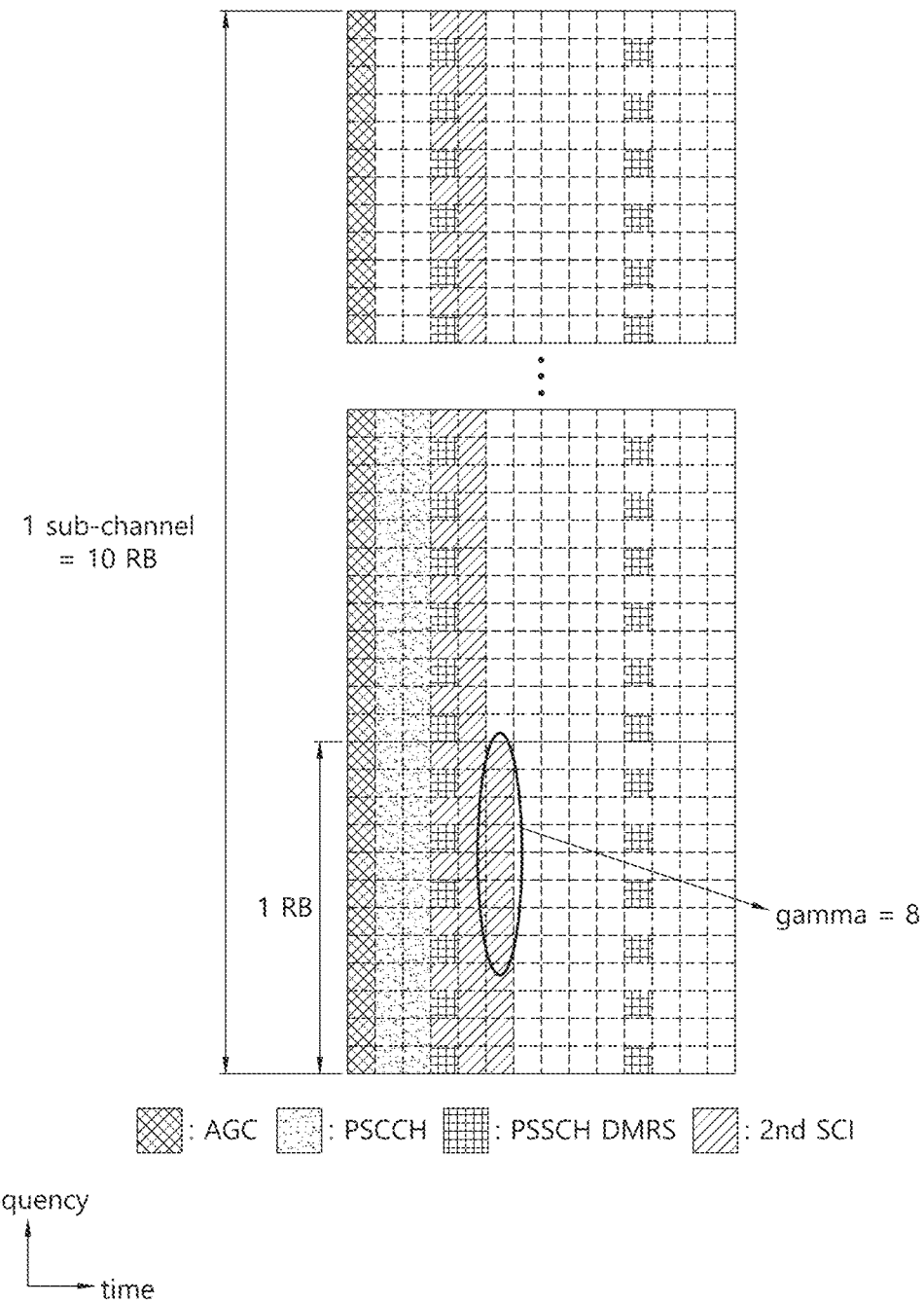

FIGS. 26 and 27 show a method for a TX UE to transmit a second SCI by rate matching the second SCI based on a gamma value, based on an embodiment of the present disclosure. The embodiments of FIGS. 26 and 27 may be combined with various embodiments of the present disclosure.

Referring to FIG. 26, if the TX UE rate-matches the second SCI based on the number of the first modulation symbols and transmits it, modulation symbols related to the second SCI may not be mapped to all REs on a specific symbol in one RB. In the embodiment of FIG. 26, if the TX UE rate-matches the second SCI based on the number of the first modulation symbols and transmits it, it is assumed that the modulation symbols related to the second SCI is not mapped to 8 REs on the 6th symbol. In this case, the TX UE may obtain the number of second modulation symbols by applying a gamma value of 8, and the TX UE may obtain modulation symbols based on the number of second modulation symbols. Therefore, referring to FIG. 27, if the TX UE rate-matches the second SCI based on the number of the second modulation symbols and transmits it, the modulation symbols related to the second SCI may be mapped to all REs on the specific symbol in one RB.

Figure 28:
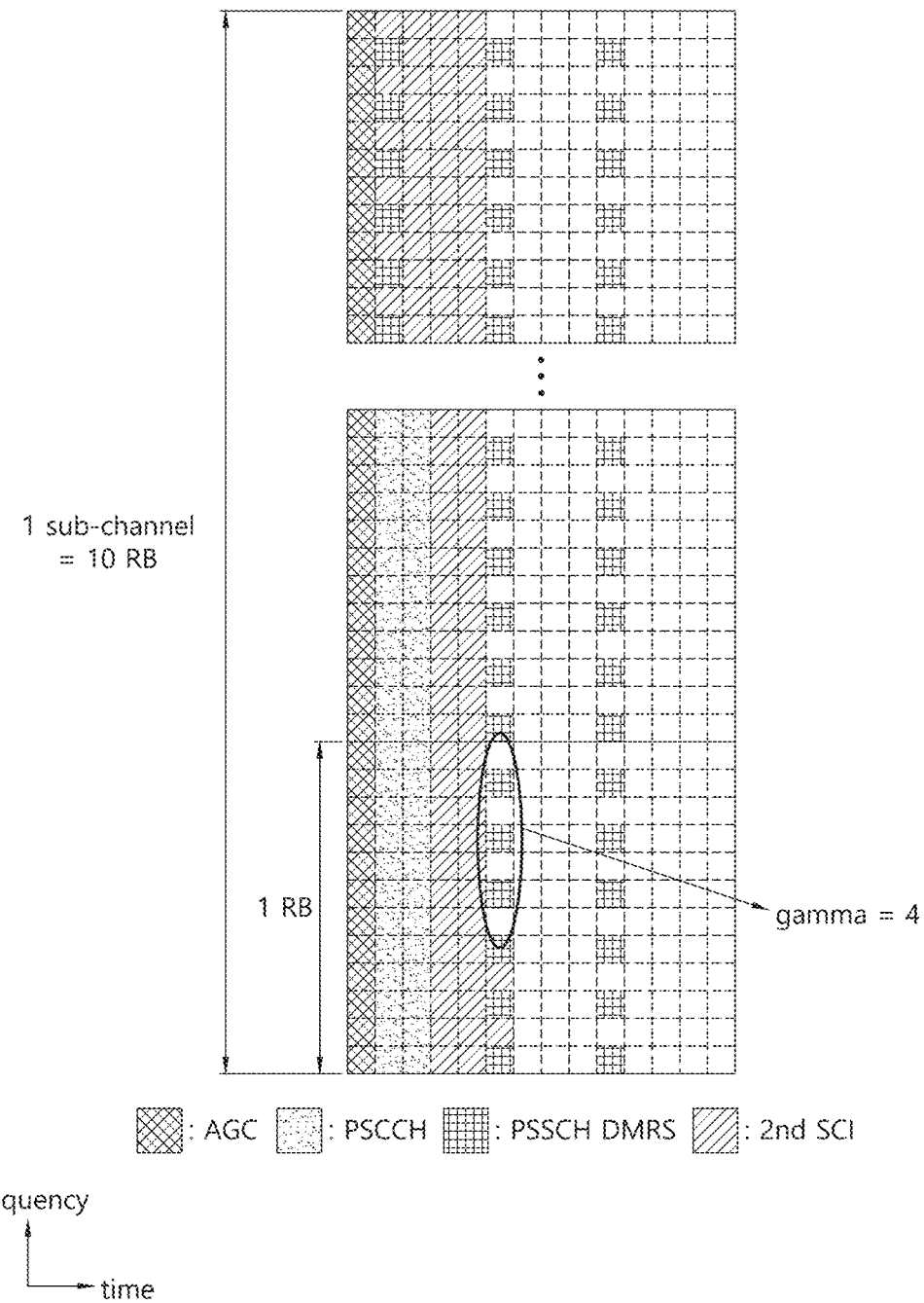
FIGS. 28 and 29 show a method for a TX UE to transmit a second SCI by rate matching the second SCI based on a gamma value, based on an embodiment of the present disclosure.
Figure 29:
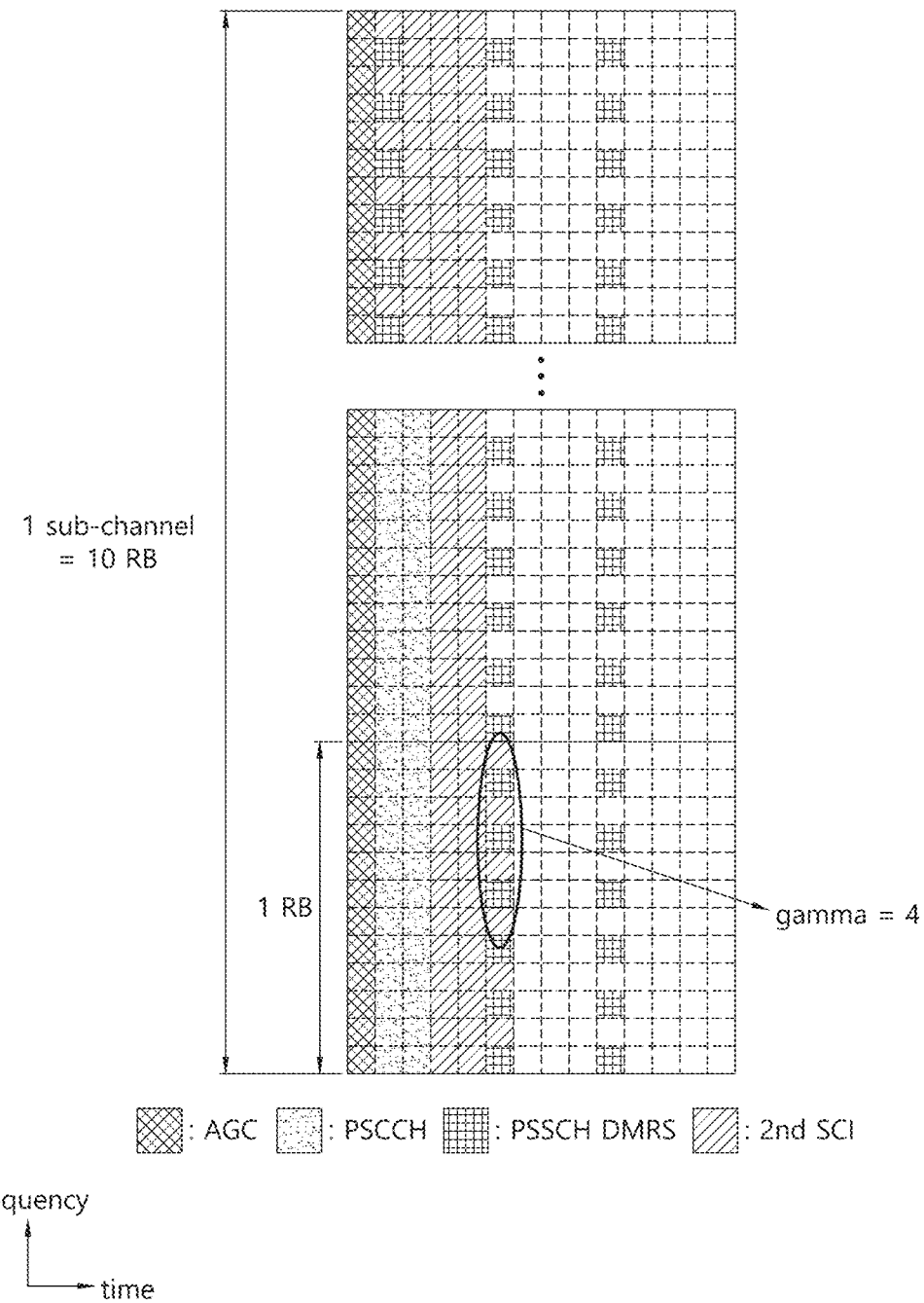

FIGS. 28 and 29 show a method for a TX UE to transmit a second SCI by rate matching the second SCI based on a gamma value, based on an embodiment of the present disclosure. The embodiments of FIGS. 28 and 29 may be combined with various embodiments of the present disclosure.

Referring to FIG. 28, if the TX UE rate-matches the second SCI based on the number of the first modulation symbols and transmits it, modulation symbols related to the second SCI may not be mapped to all REs on a specific symbol in one RB. In the embodiment of FIG. 28, if the TX UE rate-matches the second SCI based on the number of the first modulation symbols and transmits it, it is assumed that the modulation symbols related to the second SCI is not mapped to 4 REs on the 6th symbol. That is, the modulation symbols related to the second SCI may not be mapped to 4 REs on the 6th symbol, among REs to which the modulation symbols related to the second SCI can be mapped (e.g., except an RE to which a DMRS is mapped or an RE to which a PT-RS is mapped). In this case, the TX UE may obtain the number of second modulation symbols by applying a gamma value of 4, and the TX UE may obtain modulation symbols based on the number of second modulation symbols. Therefore, referring to FIG. 29, if the TX UE rate-matches the second SCI based on the number of the second modulation symbols and transmits it, the modulation symbols related to the second SCI may be mapped to all REs on the specific symbol in one RB.

Referring back to FIG. 23, in step S2360, the TX UE may transmit the first SCI and the second SCI to the RX UE. For example, the first SCI may be transmitted through the PSCCH. For example, the second SCI may be transmitted through the PSSCH.

If the TX UE maps the second SCI so as not to fill all REs on the specific symbol on the (one) RB and transmits it to the RX UE (e.g., a type of truncation), a problem in which performance (e.g., detection performance) of the second SCI decreases may occur. Therefore, according to the above-described embodiment, when the number of REs to which the second SCI is mapped is adjusted in the unit of an RB, if the number of REs to which the remaining second SCI is mapped does not fill one RB, the number of REs to which the second SCI is mapped may be increased so that the number of REs to which the second SCI is mapped may fill one RB. Through this, the second SCI performance can be guaranteed regardless of changes in the number of PSSCH-related RBs, PSSCH modulation order, and the like. Furthermore, if the number of REs to which the second SCI is mapped is adjusted in the unit of an RB, the complexity of UE implementation can be reduced.

For example, the UE may determine whether to apply at least one rule among rules proposed in various embodiments of the present disclosure, based on whether the UE performs a chain-based resource reservation operation. For example, the UE may determine whether to apply at least one rule among rules proposed in various embodiments of the present disclosure, based on whether the UE performs a block-based resource reservation operation. For example, the UE may determine whether to apply at least one rule among rules proposed in various embodiments of the present disclosure, based on whether the UE performs a blind retransmission operation. For example, the UE may determine whether to apply at least one rule among rules proposed in various embodiments of the present disclosure, based on whether the UE performs a SL HARQ feedback-based retransmission operation. For example, the UE may determine whether to apply at least one rule among rules proposed in various embodiments of the present disclosure, based on whether the UE performs a CG-based resource selection/reservation operation. For example, the UE may determine whether to apply at least one rule among rules proposed in various embodiments of the present disclosure, based on whether the UE performs a DG-based resource selection/reservation operation.

For example, whether the UE applies at least one rule among rules proposed in various embodiments of the present disclosure may be configured differently or limitedly for the UE for each resource pool. For example, whether the UE applies at least one rule among rules proposed in various embodiments of the present disclosure may be configured differently or limitedly for the UE for each service type. For example, whether the UE applies at least one rule among rules proposed in various embodiments of the present disclosure may be configured differently or limitedly for the UE for each service priority. For example, whether the UE applies at least one rule among rules proposed in various embodiments of the present disclosure may be configured differently or limitedly for the UE for each cast type. For example, the cast type may include at least one of unicast, groupcast, and/or broadcast. For example, whether the UE applies at least one rule among rules proposed in various embodiments of the present disclosure may be configured differently or limitedly for the UE for each destination UE. For example, whether the UE applies at least one rule among rules proposed in various embodiments of the present disclosure may be configured differently or limitedly for the UE for each (L1 or L2) destination ID. For example, whether the UE applies at least one rule among rules proposed in various embodiments of the present disclosure may be configured differently or limitedly for the UE for each (L1 or L2) source ID. For example, whether the UE applies at least one rule among rules proposed in various embodiments of the present disclosure may be configured differently or limitedly for the UE for each (service) QoS parameter. For example, the (service) QoS parameter may include at least one of a reliability related parameter, a latency related parameter, and/or a (target) block error rate (BLER) related parameter. For example, whether the UE applies at least one rule among rules proposed in various embodiments of the present disclosure may be configured differently or limitedly for the UE for each (resource pool) congestion level. For example, whether the UE applies at least one rule among rules proposed in various embodiments of the present disclosure may be configured differently or limitedly for the UE for each SL mode type. For example, the SL mode type may include SL mode 1 and/or SL mode 2. For example, whether the UE applies at least one rule among rules proposed in various embodiments of the present disclosure may be configured differently or limitedly for the UE for each grant type. For example, the grant type may include CG and/or DG. For example, whether the UE applies at least one rule among rules proposed in various embodiments of the present disclosure may be configured differently or limitedly for the UE for each packet/message (e.g., TB) size. For example, whether the UE applies at least one rule among rules proposed in various embodiments of the present disclosure may be configured differently or limitedly for the UE for each number of subchannels used by the UE to transmit a PSSCH. For example, whether the UE applies at least one rule among rules proposed in various embodiments of the present disclosure may be configured differently or limitedly for the UE for each number of RBs used by the UE to transmit a PSCCH. For example, whether the UE applies at least one rule among rules proposed in various embodiments of the present disclosure may be configured differently or limitedly for the UE for each number of RBs included in (one) subchannel. For example, whether the UE applies at least one rule among rules proposed in various embodiments of the present disclosure may be configured differently or limitedly for the UE for each number of subchannels included in a resource pool and/or for each number of RBs included in the resource pool. For example, whether the UE applies at least one rule among rules proposed in various embodiments of the present disclosure may be configured differently or limitedly for the UE based on whether the (one) subchannel size and the PSCCH (frequency) resource size are the same. For example, whether the UE applies at least one rule among rules proposed in various embodiments of the present disclosure may be configured differently or limitedly for the UE based on whether a (semi) static codebook is configured for the UE. For example, whether the UE applies at least one rule among rules proposed in various embodiments of the present disclosure may be configured differently or limitedly for the UE based on (SL communication-related) numerology. For example, the numerology may include subcarrier spacing and/or CP length. For example, whether the UE applies at least one rule among rules proposed in various embodiments of the present disclosure may be configured differently or limitedly for the UE based on whether a SL CSI reporting operation is configured for the UE on a sub-band (with a pre-configured size). For example, whether the UE applies at least one rule among rules proposed in various embodiments of the present disclosure may be configured differently or limitedly for the UE based on whether the SL CSI reporting operation is configured for the UE on a wide-band (based on a PSSCH frequency resource). For example, whether the UE applies at least one rule among rules proposed in various embodiments of the present disclosure may be configured differently or limitedly for the UE based on whether a precoding application operation is configured for the UE on a sub-band (with a pre-configured size) on a PSCCH and/or a PSSCH. For example, whether the UE applies at least one rule among rules proposed in various embodiments of the present disclosure may be configured differently or limitedly for the UE based on whether a precoding application operation is configured for the UE on a wide-band (based on PSCCH and/or PSSCH frequency resources).

For example, parameters may be configured differently or limitedly for the UE based on whether the UE performs a chain-based resource reservation operation. For example, parameters may be configured differently or limitedly for the UE based on whether the UE performs a block-based resource reservation operation. For example, parameters may be configured differently or limitedly for the UE based on whether the UE performs a blind retransmission operation. For example, parameters may be configured differently or limitedly for the UE based on whether the UE performs a SL HARQ feedback-based retransmission operation. For example, parameters may be configured differently or limitedly for the UE based on whether the UE performs a CG-based resource selection/reservation operation. For example, parameters may be configured differently or limitedly for the UE based on whether the UE performs a DG-based resource selection/reservation operation.

For example, parameters may be configured differently or limitedly for the UE for each resource pool. For example, parameters may be configured differently or limitedly for the UE for each service type. For example, parameters may be configured differently or limitedly for the UE for each service priority. For example, parameters may be configured differently or limitedly for the UE for each cast type. For example, the cast type may include at least one of unicast, groupcast, and/or broadcast. For example, parameters may be configured differently or limitedly for the UE for each destination UE. For example, parameters may be configured differently or limitedly for the UE for each (L1 or L2) destination ID. For example, parameters may be configured differently or limitedly for the UE for each (L1 or L2) source ID. For example, parameters may be configured differently or limitedly for the UE for each (service) QoS parameter. For example, the (service) QoS parameter may include at least one of a reliability-related parameter, a latency-related parameter, and/or a (target) BLER-related parameter. For example, parameters may be configured differently or limitedly for the UE for each (resource pool) congestion level. For example, parameters may be configured differently or limitedly for the UE for each SL mode type. For example, the SL mode type may include SL mode 1 and/or SL mode 2. For example, parameters may be configured differently or limitedly for the UE for each grant type. For example, the grant type may include CG and/or DG. For example, parameters may be configured differently or limitedly for the UE for each packet/message (e.g., TB) size. For example, parameters may be configured differently or limitedly for the UE for each number of subchannels used by the UE to transmit a PSSCH. For example, parameters may be configured differently or limitedly for the UE for each number of RBs used by the UE to transmit a PSCCH. For example, parameters may be configured differently or limitedly for the UE for each number of RBs included in (one) subchannel. For example, parameters may be configured differently or limitedly for the UE for each number of subchannels included in a resource pool and/or for each number of RBs included in the resource pool. For example, parameters may be configured differently or limitedly for the UE based on whether the (one) subchannel size and the PSCCH (frequency) resource size are the same. For example, parameters may be configured differently or limitedly for the UE based on whether a (semi) static codebook is configured for the UE. For example, parameters may be configured differently or limitedly for the UE based on a numerology (related to SL communication). For example, the numerology may include subcarrier spacing and/or CP length. For example, parameters may be configured differently or limitedly for the UE based on whether a SL CSI reporting operation is configured for the UE on a sub-band (with a pre-configured size). For example, parameters may be configured differently or limitedly for the UE based on whether a SL CSI reporting operation is configured for the UE on a wide-band (based on a PSSCH frequency resource). For example, parameters may be configured differently or limitedly for the UE based on whether a precoding application operation is configured for the UE on a sub-band (with a pre-configured size) on a PSCCH and/or a PSSCH. For example, parameters may be configured differently or limitedly for the UE based on whether a precoding application operation is configured for the UE on a wide-band (based on PSCCH and/or PSSCH frequency resources).

Figure 30:
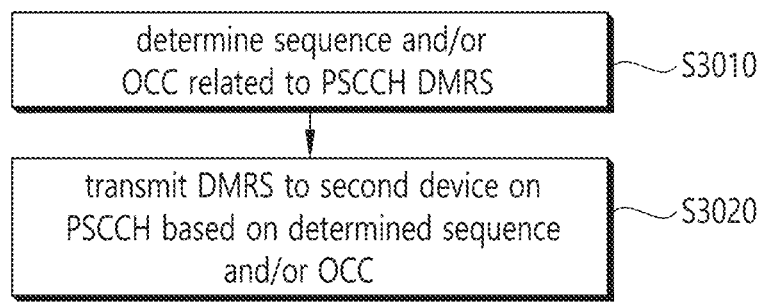
FIG. 30 shows a method for a first device to transmit a DMRS on a PSCCH, based on an embodiment of the present disclosure.

FIG. 30 shows a method for a first device to transmit a DMRS on a PSCCH, based on an embodiment of the present disclosure. The embodiment of FIG. 30 may be combined with various embodiments of the present disclosure.

Referring to FIG. 30, in step S3010, the first device may determine a sequence and/or OCC related to a PSCCH DMRS. For example, OCC may include FD-OCC and/or TD-OCC. For example, the first device may (pre-)configure a plurality of sequences and/or a plurality of OCCs related to the PSCCH DMRS. For example, the first device may determine the sequence and/or OCC related to the PSCCH DMRS based on various embodiments of the present disclosure. In step S3020, the first device may transmit the DMRS to the second device on the PSCCH based on the determined sequence and/or OCC.

Figure 31:
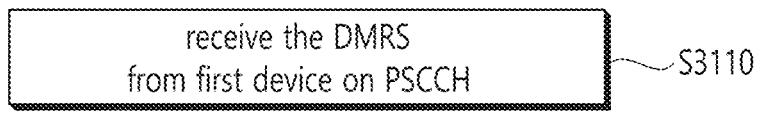
FIG. 31 shows a method for a second device to receive a DMRS on a PSCCH, based on an embodiment of the present disclosure.

FIG. 31 shows a method for a second device to receive a DMRS on a PSCCH, based on an embodiment of the present disclosure. The embodiment of FIG. 31 may be combined with various embodiments of the present disclosure.

Referring to FIG. 31, in step S3110, the second device may receive the DMRS from the first device on the PSCCH. For example, the DMRS may be determined by the first device based on a sequence and/or OCC related to the PSCCH DMRS. For example, the sequence and/or OCC related to the PSCCH DMRS may be determined by the first device based on various embodiments of the present disclosure.

Figure 32:
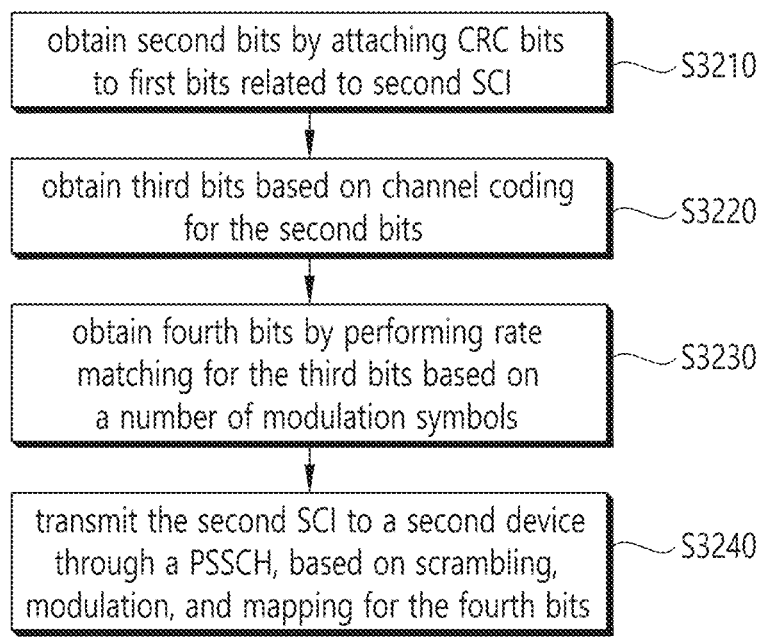
FIG. 32 shows a method for a first device to perform wireless communication, based on an embodiment of the present disclosure.

FIG. 32 shows a method for a first device to perform wireless communication, based on an embodiment of the present disclosure. The embodiment of FIG. 32 may be combined with various embodiments of the present disclosure.

Referring to FIG. 32, in step S3210, the first device may obtain second bits by attaching cyclic redundancy check (CRC) bits to first bits related to second sidelink control information (SCI). In step S3220, the first device may obtain third bits based on channel coding for the second bits. In step S3230, the first device may obtain fourth bits by performing rate matching for the third bits based on a number of modulation symbols. For example, the number of modulation symbols may be obtained based on a number of the first bits, a number of the CRC bits, a beta offset value included in first SCI related to the second SCI, an alpha value configured per a resource pool, a number of symbols related to physical sidelink shared channel (PSSCH) transmission, a number of resource elements (REs) related to transmission of the second SCI for each symbol, and a gamma value, and the gamma value may be a number of vacant REs in a resource block (RB) to which a last symbol related to the second SCI belongs. In step S3240, the first device may transmit the second SCI to a second device through a PSSCH, based on scrambling, modulation, and mapping for the fourth bits.

For example, the number of modulation symbols may be obtained by adding the gamma value to a minimum value among (i) a first value obtained based on a value obtained by multiplying a sum of the number of first bits and the number of CRC bits by the beta offset value and (ii) a second value obtained based on the alpha value, the number of symbols related to the PSSCH transmission, and the number of REs related to the transmission of the second SCI for each symbol.

For example, the number of vacant REs may be a number of REs to which the second SCI is not mapped, among a plurality of REs on the last symbol in the RB to which the last symbol related to the second SCI mapped based on the minimum value belongs, and the plurality of REs may be REs to which the second SCI can be mapped. For example, the gamma value may be zero, based on that the number of REs to which the second SCI is not mapped, among the plurality of REs on the last symbol in the RB to which the last symbol related to the second SCI mapped based on the minimum value belongs, is zero. For example, the gamma value may be N, based on that the number of REs to which the second SCI is not mapped, among the plurality of REs on the last symbol in the RB to which the last symbol related to the second SCI mapped based on the minimum value belongs, is N, and N may be a positive integer.

For example, based on the gamma value, the modulation symbols may be mapped to the vacant REs on the last symbol in the RB to which the last symbol related to the second SCI belongs.

For example, the second value may be obtained based on the following equation.

$$\text{second value} = \left\lceil \alpha \sum_{l=0}^{N_{symbol}^{PSSCH}-1} M_{sc}^{SCI2}(l) \right\rceil$$

Herein, $\alpha$ may be the alpha value, and $N^{PSSCH}_{symbol}$ may be the number of symbols related to the PSSCH transmission, and $M^{SCI2}_{sc}(l)$ may be the number of REs related to the transmission of the second SCI in symbol l.

For example, a number of automatic gain control (AGC) symbols may be excluded from the number of symbols related to the PSSCH transmission.

Additionally, for example, the first device may transmit, to the second device through a physical sidelink control channel (PSCCH), the first SCI for scheduling of the PSSCH and the second SCI.

For example, the number of REs related to the transmission of the second SCI for each symbol may be a value obtained by subtracting a number of REs related to PSCCH transmission for each symbol from a number of REs related to PSSCH transmission for each symbol.

For example, the number of CRC bits may be 24.

For example, the channel coding for the second bits may be polar coding.

For example, the modulation symbols may be mapped such that there is no remaining REs on a symbol to which the last symbol is mapped in the RB to which the last symbol related to the second SCI belongs.

The proposed method can be applied to the device(s) based on various embodiments of the present disclosure. First, the processor 102 of the first device 100 may obtain second bits by attaching cyclic redundancy check (CRC) bits to first bits related to second sidelink control information (SCI). In addition, the processor 102 of the first device 100 may obtain third bits based on channel coding for the second bits. In addition, the processor 102 of the first device 100 may obtain fourth bits by performing rate matching for the third bits based on a number of modulation symbols. For example, the number of modulation symbols may be obtained based on a number of the first bits, a number of the CRC bits, a beta offset value included in first SCI related to the second SCI, an alpha value configured per a resource pool, a number of symbols related to physical sidelink shared channel (PSSCH) transmission, a number of resource elements (REs) related to transmission of the second SCI for each symbol, and a gamma value, and the gamma value may be a number of vacant REs in a resource block (RB) to which a last symbol related to the second SCI belongs. In addition, the processor 102 of the first device 100 may control the transceiver 106 to transmit the second SCI to a second device through a PSSCH, based on scrambling, modulation, and mapping for the fourth bits.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: obtain second bits by attaching cyclic redundancy check (CRC) bits to first bits related to second sidelink control information (SCI); obtain third bits based on channel coding for the second bits; obtain fourth bits by performing rate matching for the third bits based on a number of modulation symbols, wherein the number of modulation symbols is obtained based on a number of the first bits, a number of the CRC bits, a beta offset value included in first SCI related to the second SCI, an alpha value configured per a resource pool, a number of symbols related to physical sidelink shared channel (PSSCH) transmission, a number of resource elements (REs) related to transmission of the second SCI for each symbol, and a gamma value, and wherein the gamma value is a number of vacant REs in a resource block (RB) to which a last symbol related to the second SCI belongs; and transmit the second SCI to a second device through a PSSCH, based on scrambling, modulation, and mapping for the fourth bits.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: obtain second bits by attaching cyclic redundancy check (CRC) bits to first bits related to second sidelink control information (SCI); obtain third bits based on channel coding for the second bits; obtain fourth bits by performing rate matching for the third bits based on a number of modulation symbols, wherein the number of modulation symbols is obtained based on a number of the first bits, a number of the CRC bits, a beta offset value included in first SCI related to the second SCI, an alpha value configured per a resource pool, a number of symbols related to physical sidelink shared channel (PSSCH) transmission, a number of resource elements (REs) related to transmission of the second SCI for each symbol, and a gamma value, and wherein the gamma value is a number of vacant REs in a resource block (RB) to which a last symbol related to the second SCI belongs; and transmit the second SCI to a second UE through a PSSCH, based on scrambling, modulation, and mapping for the fourth bits.

Based on an embodiment of the present disclosure, a non-transitory computer-readable storage medium storing instructions may be provided. For example, the instructions, when executed, may cause a first device to: obtain second bits by attaching cyclic redundancy check (CRC) bits to first bits related to second sidelink control information (SCI); obtain third bits based on channel coding for the second bits; obtain fourth bits by performing rate matching for the third bits based on a number of modulation symbols, wherein the number of modulation symbols is obtained based on a number of the first bits, a number of the CRC bits, a beta offset value included in first SCI related to the second SCI, an alpha value configured per a resource pool, a number of symbols related to physical sidelink shared channel (PSSCH) transmission, a number of resource elements (REs) related to transmission of the second SCI for each symbol, and a gamma value, and wherein the gamma value is a number of vacant REs in a resource block (RB) to which a last symbol related to the second SCI belongs; and transmit the second SCI to a second device through a PSSCH, based on scrambling, modulation, and mapping for the fourth bits.

Figure 33:
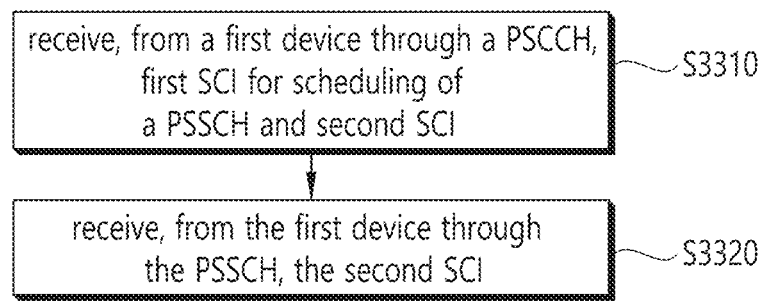
FIG. 33 shows a method for a second device to perform wireless communication, based on an embodiment of the present disclosure.

FIG. 33 shows a method for a second device to perform wireless communication, based on an embodiment of the present disclosure. The embodiment of FIG. 33 may be combined with various embodiments of the present disclosure.

Referring to FIG. 33, in step S3310, the second device may receive, from a first device through a physical sidelink control channel (PSCCH), first sidelink control information (SCI) for scheduling of a physical sidelink shared channel (PSSCH) and second SCI. In step S3320, the second device may receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, fourth bits may be obtained, by the first device, by performing rate matching for the third bits based on a number of modulation symbols. For example, the number of modulation symbols may be obtained based on a number of the first bits, a number of the CRC bits, a beta offset value included in the first SCI related to the second SCI, an alpha value configured per a resource pool, a number of symbols related to PSSCH transmission, a number of resource elements (REs) related to transmission of the second SCI for each symbol, and a gamma value. For example, the gamma value may be a number of vacant REs in a resource block (RB) to which a last symbol related to the second SCI belongs. For example, the second SCI may be received from the first device through the PSSCH, based on scrambling, modulation, and mapping for the fourth bits.

The proposed method can be applied to the device(s) based on various embodiments of the present disclosure. First, the processor 202 of the second device 200 may control the transceiver 206 to receive, from a first device through a physical sidelink control channel (PSCCH), first sidelink control information (SCI) for scheduling of a physical sidelink shared channel (PSSCH) and second SCI. In addition, the processor 202 of the second device 200 may control the transceiver 206 to receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, fourth bits may be obtained, by the first device, by performing rate matching for the third bits based on a number of modulation symbols. For example, the number of modulation symbols may be obtained based on a number of the first bits, a number of the CRC bits, a beta offset value included in the first SCI related to the second SCI, an alpha value configured per a resource pool, a number of symbols related to PSSCH transmission, a number of resource elements (REs) related to transmission of the second SCI for each symbol, and a gamma value. For example, the gamma value may be a number of vacant REs in a resource block (RB) to which a last symbol related to the second SCI belongs. For example, the second SCI may be received from the first device through the PSSCH, based on scrambling, modulation, and mapping for the fourth bits.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), first sidelink control information (SCI) for scheduling of a physical sidelink shared channel (PSSCH) and second SCI; and receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, fourth bits may be obtained, by the first device, by performing rate matching for the third bits based on a number of modulation symbols. For example, the number of modulation symbols may be obtained based on a number of the first bits, a number of the CRC bits, a beta offset value included in the first SCI related to the second SCI, an alpha value configured per a resource pool, a number of symbols related to PSSCH transmission, a number of resource elements (REs) related to transmission of the second SCI for each symbol, and a gamma value. For example, the gamma value may be a number of vacant REs in a resource block (RB) to which a last symbol related to the second SCI belongs. For example, the second SCI may be received from the first device through the PSSCH, based on scrambling, modulation, and mapping for the fourth bits.

Based on an embodiment of the present disclosure, an apparatus configured to control a second user equipment (UE) may be provided. For example, the apparatus may comprise: one or more processors; and one or more memories operably connected to the one or more processors and storing instructions. For example, the one or more processors may execute the instructions to: receive, from a first UE through a physical sidelink control channel (PSCCH), first sidelink control information (SCI) for scheduling of a physical sidelink shared channel (PSSCH) and second SCI; and receive, from the first UE through the PSSCH, the second SCI. For example, second bits may be obtained, by the first UE, by attaching cyclic redundancy check (CRC) bits to first bits related to the second SCI. For example, third bits may be obtained, by the first UE, based on channel coding for the second bits. For example, fourth bits may be obtained, by the first UE, by performing rate matching for the third bits based on a number of modulation symbols. For example, the number of modulation symbols may be obtained based on a number of the first bits, a number of the CRC bits, a beta offset value included in the first SCI related to the second SCI, an alpha value configured per a resource pool, a number of symbols related to PSSCH transmission, a number of resource elements (REs) related to transmission of the second SCI for each symbol, and a gamma value. For example, the gamma value may be a number of vacant REs in a resource block (RB) to which a last symbol related to the second SCI belongs. For example, the second SCI may be received from the first UE through the PSSCH, based on scrambling, modulation, and mapping for the fourth bits.

Based on an embodiment of the present disclosure, a non-transitory computer-readable storage medium storing instructions may be provided. For example, the instructions, when executed, may cause a second device to: receive, from a first device through a physical sidelink control channel (PSCCH), first sidelink control information (SCI) for scheduling of a physical sidelink shared channel (PSSCH) and second SCI; and receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, fourth bits may be obtained, by the first device, by performing rate matching for the third bits based on a number of modulation symbols. For example, the number of modulation symbols may be obtained based on a number of the first bits, a number of the CRC bits, a beta offset value included in the first SCI related to the second SCI, an alpha value configured per a resource pool, a number of symbols related to PSSCH transmission, a number of resource elements (REs) related to transmission of the second SCI for each symbol, and a gamma value. For example, the gamma value may be a number of vacant REs in a resource block (RB) to which a last symbol related to the second SCI belongs. For example, the second SCI may be received from the first device through the PSSCH, based on scrambling, modulation, and mapping for the fourth bits.

Figure 34:
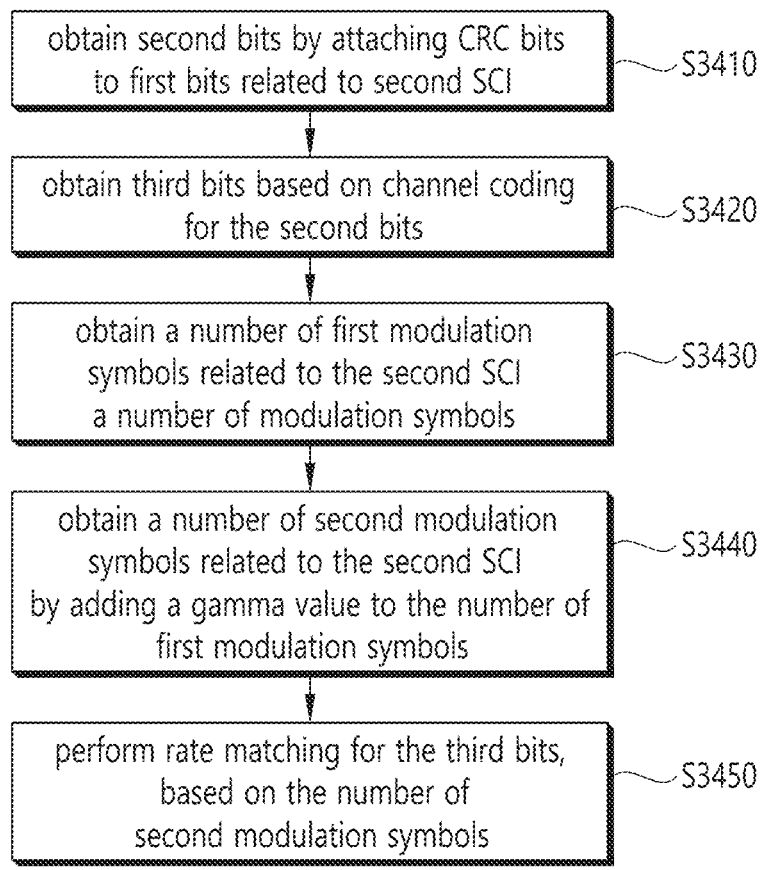
FIG. 34 shows a method for a first device to perform wireless communication, based on an embodiment of the present disclosure.

FIG. 34 shows a method for a first device to perform wireless communication, based on an embodiment of the present disclosure. The embodiment of FIG. 34 may be combined with various embodiments of the present disclosure.

Referring to FIG. 34, in step S3410, the first device may obtain second bits by attaching cyclic redundancy check (CRC) bits to first bits related to second sidelink control information (SCI). In step S3420, the first device may obtain third bits based on channel coding for the second bits. In step S3430, the first device may obtain a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol. In step S3440, the first device may obtain a number of second modulation symbols related to the second SCI by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. In step S3450, the first device may perform rate matching for the third bits, based on the number of second modulation symbols.

For example, the plurality of REs may be REs capable of mapping the second SCI. For example, the plurality of REs may not include an RE to which a demodulation reference signal (DMRS) or a phase tracking reference signal (PT-RS) is mapped. For example, the gamma value may be the number of at least one RE to which the first modulation symbols are not mapped.

Additionally, for example, the first device may transmit, to a second device through a physical sidelink control channel (PSCCH), the first SCI for scheduling of a PSSCH and the second SCI. Additionally, for example, the first device may transmit, to the second device through the PSSCH, the second SCI based on scrambling, modulation, and mapping of the third bits rate-matched based on the number of second modulation symbols. For example, a last modulation symbol among the second modulation symbols may be mapped to a subcarrier related to a highest index among subcarriers capable of mapping the second SCI in the RB. For example, the second modulation symbols may be mapped such that there is no remaining RE on a specific symbol in the RB, and the last modulation symbol among the second modulation symbols may be mapped to the specific symbol.

The number of first modulation symbols may be a minimum value among (i) a first value obtained based on a value obtained by multiplying a sum of the number of first bits and the number of CRC bits by the beta offset value and (ii) a second value obtained based on the alpha value, the number of symbols related to the PSSCH transmission, and the number of REs related to the transmission of the second SCI per a symbol.

For example, the gamma value may be N, based on that the number of at least one RE to which the first modulation symbols are not mapped among the plurality of REs on the symbol to which the last modulation symbol is mapped within the RB to which the last modulation symbol belongs is N, and the plurality of REs may be REs capable of mapping the second SCI, and N may be a zero or positive integer.

Additionally, for example, the first device may select a synchronization reference based on the sidelink (SL) synchronization priority. For example, the SL synchronization priority may be set to a global navigation satellite system (GNSS)-based synchronization or a base station (BS)-based synchronization, and the synchronization reference may include at least one of a GNSS, a base station, or a UE, and based on the SL synchronization priority being set to the GNSS-based synchronization, a synchronization priority related to the GNSS may be higher than a synchronization priority related to the base station, and based on the SL synchronization priority being set to the BS-based synchronization, a synchronization priority related to the base station may be higher than a synchronization priority related to the GNSS. Additionally, for example, the first device may obtain synchronization based on the synchronization reference.

For example, a number of automatic gain control (AGC) symbols may be excluded from the number of symbols related to the PSSCH transmission, and the number of REs related to the transmission of the second SCI per a symbol may be a value obtained by subtracting a number of REs related to PSCCH transmission per a symbol from a number of REs related to PSSCH transmission per a symbol.

For example, the number of CRC bits may be 24, and the channel coding for the second bits may be polar coding, and the gamma value may be a number of vacant REs in the RB to which the last modulation symbol belongs.

The proposed method can be applied to the device(s) based on various embodiments of the present disclosure. First, the processor 102 of the first device 100 may obtain second bits by attaching cyclic redundancy check (CRC) bits to first bits related to second sidelink control information (SCI). In addition, the processor 102 of the first device 100 may obtain third bits based on channel coding for the second bits. In addition, the processor 102 of the first device 100 may obtain a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol. In addition, the processor 102 of the first device 100 may obtain a number of second modulation symbols related to the second SCI by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. In addition, the processor 102 of the first device 100 may perform rate matching for the third bits, based on the number of second modulation symbols.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: obtain second bits by attaching cyclic redundancy check (CRC) bits to first bits related to second sidelink control information (SCI); obtain third bits based on channel coding for the second bits; obtain a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol; based on a number of at least one RE to which the first modulation symbols are not mapped among a plurality of REs on a symbol to which a last modulation symbol is mapped within a resource block (RB) to which the last modulation symbol belongs among the first modulation symbols, obtain a number of second modulation symbols related to the second SCI by adding a gamma value to the number of first modulation symbols; and perform rate matching for the third bits, based on the number of second modulation symbols.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: obtain second bits by attaching cyclic redundancy check (CRC) bits to first bits related to second sidelink control information (SCI); obtain third bits based on channel coding for the second bits; obtain a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol; based on a number of at least one RE to which the first modulation symbols are not mapped among a plurality of REs on a symbol to which a last modulation symbol is mapped within a resource block (RB) to which the last modulation symbol belongs among the first modulation symbols, obtain a number of second modulation symbols related to the second SCI by adding a gamma value to the number of first modulation symbols; and perform rate matching for the third bits, based on the number of second modulation symbols.

Based on an embodiment of the present disclosure, anon-transitory computer-readable storage medium storing instructions may be provided. For example, the instructions, when executed, may cause a first device to: obtain second bits by attaching cyclic redundancy check (CRC) bits to first bits related to second sidelink control information (SCI); obtain third bits based on channel coding for the second bits; obtain a number of first modulation symbols related to the second SCI, based on a number of the first bits, a number of the CRC bits, a beta offset value included in first SCI related to the second SCI, an alpha value configured per a resource pool, a number of symbols related to physical sidelink shared channel (PSSCH) transmission, and a number of resource elements (REs) related to transmission of the second SCI per a symbol; based on a number of at least one RE to which the first modulation symbols are not mapped among a plurality of REs on a symbol to which a last modulation symbol is mapped within a resource block (RB) to which the last modulation symbol belongs among the first modulation symbols, obtain a number of second modulation symbols related to the second SCI by adding a gamma value to the number of first modulation symbols; and perform rate matching for the third bits, based on the number of second modulation symbols.

Figure 35:
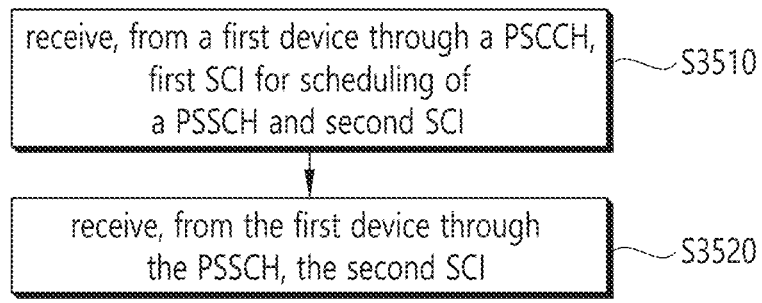
FIG. 35 shows a method for a second device to perform wireless communication, based on an embodiment of the present disclosure.

FIG. 35 shows a method for a second device to perform wireless communication, based on an embodiment of the present disclosure. The embodiment of FIG. 35 may be combined with various embodiments of the present disclosure.

Referring to FIG. 35, in step S3510, the second device may receive, from a first device through a physical sidelink control channel (PSCCH), first sidelink control information (SCI) for scheduling of a physical sidelink shared channel (PSSCH) and second SCI. In step S3520, the second device may receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, a number of first modulation symbols related to the second SCI may be obtained, by the first device, based on a number of the first bits, a number of the CRC bits, a beta offset value included in the first SCI related to the second SCI, an alpha value configured per a resource pool, a number of symbols related to physical sidelink shared channel (PSSCH) transmission, and a number of resource elements (REs) related to transmission of the second SCI per a symbol. For example, a number of second modulation symbols related to the second SCI may be obtained, by the first device, by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. For example, rate matching for the third bits may be performed, by the first device, based on the number of second modulation symbols.

The proposed method can be applied to the device(s) based on various embodiments of the present disclosure. First, the processor 202 of the second device 200 may control the transceiver 206 to receive, from a first device through a physical sidelink control channel (PSCCH), first sidelink control information (SCI) for scheduling of a physical sidelink shared channel (PSSCH) and second SCI. In addition, the processor 202 of the second device 200 may control the transceiver 206 to receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, a number of first modulation symbols related to the second SCI may be obtained, by the first device, based on a number of the first bits, a number of the CRC bits, a beta offset value included in the first SCI related to the second SCI, an alpha value configured per a resource pool, a number of symbols related to physical sidelink shared channel (PSSCH) transmission, and a number of resource elements (REs) related to transmission of the second SCI per a symbol. For example, a number of second modulation symbols related to the second SCI may be obtained, by the first device, by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. For example, rate matching for the third bits may be performed, by the first device, based on the number of second modulation symbols.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), first sidelink control information (SCI) for scheduling of a physical sidelink shared channel (PSSCH) and second SCI; and receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, a number of first modulation symbols related to the second SCI may be obtained, by the first device, based on a number of the first bits, a number of the CRC bits, a beta offset value included in the first SCI related to the second SCI, an alpha value configured per a resource pool, a number of symbols related to physical sidelink shared channel (PSSCH) transmission, and a number of resource elements (REs) related to transmission of the second SCI per a symbol. For example, a number of second modulation symbols related to the second SCI may be obtained, by the first device, by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. For example, rate matching for the third bits may be performed, by the first device, based on the number of second modulation symbols.

Based on an embodiment of the present disclosure, an apparatus configured to control a second user equipment (UE) may be provided. For example, the apparatus may comprise: one or more processors; and one or more memories operably connected to the one or more processors and storing instructions. For example, the one or more processors may execute the instructions to: receive, from a first UE through a physical sidelink control channel (PSCCH), first sidelink control information (SCI) for scheduling of a physical sidelink shared channel (PSSCH) and second SCI; and receive, from the first UE through the PSSCH, the second SCI. For example, second bits may be obtained, by the first UE, by attaching cyclic redundancy check (CRC) bits to first bits related to the second SCI. For example, third bits may be obtained, by the first UE, based on channel coding for the second bits. For example, a number of first modulation symbols related to the second SCI may be obtained, by the first UE, based on a number of the first bits, a number of the CRC bits, a beta offset value included in the first SCI related to the second SCI, an alpha value configured per a resource pool, a number of symbols related to physical sidelink shared channel (PSSCH) transmission, and a number of resource elements (REs) related to transmission of the second SCI per a symbol. For example, a number of second modulation symbols related to the second SCI may be obtained, by the first UE, by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. For example, rate matching for the third bits may be performed, by the first UE, based on the number of second modulation symbols.

Based on an embodiment of the present disclosure, anon-transitory computer-readable storage medium storing instructions may be provided. For example, the instructions, when executed, may cause a second device to: receive, from a first device through a physical sidelink control channel (PSCCH), first sidelink control information (SCI) for scheduling of a physical sidelink shared channel (PSSCH) and second SCI; and receive, from the first device through the PSSCH, the second SCI. For example, second bits may be obtained, by the first device, by attaching cyclic redundancy check (CRC) bits to first bits related to the second SCI. For example, third bits may be obtained, by the first device, based on channel coding for the second bits. For example, a number of first modulation symbols related to the second SCI may be obtained, by the first device, based on a number of the first bits, a number of the CRC bits, a beta offset value included in the first SCI related to the second SCI, an alpha value configured per a resource pool, a number of symbols related to physical sidelink shared channel (PSSCH) transmission, and a number of resource elements (REs) related to transmission of the second SCI per a symbol. For example, a number of second modulation symbols related to the second SCI may be obtained, by the first device, by adding a gamma value to the number of first modulation symbols, based on a number of at least one RE to which the first modulation symbols are not mapped among a plurality of REs on a symbol to which a last modulation symbol is mapped within a resource block (RB) to which the last modulation symbol belongs among the first modulation symbols. For example, rate matching for the third bits may be performed, by the first device, based on the number of second modulation symbols.

Various embodiments of the present disclosure may be combined with each other.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a communication device configured to perform sidelink communication, the method comprising:
obtaining a reference value used for determining a number of modulation symbols for transmission of second sidelink control information (SCI), based on:
a number of bits of the second SCI;
a number of cyclic redundancy check (CRC) bits for the second SCI;
a beta offset value in first SCI related to the second SCI;
an alpha value configured for a resource pool;
a number of symbols for physical sidelink shared channel (PSSCH) transmission; and
a number of resource elements (REs) for transmission of the second SCI in each symbol;
determining the number of modulation symbols for transmission of the second SCI, based on adding a gamma value to the reference value,
wherein the gamma value is a number of vacant REs in a resource block (RB) to which a last modulation symbol of the second SCI belongs; and
transmitting the second SCI on a PSSCH, based on the number of modulation symbols for transmission of the second SCI.

2. The method of claim 1, wherein the second SCI is mapped to a plurality of REs, and
wherein the plurality of REs do not include an RE to which a demodulation reference signal (DMRS) or a phase tracking reference signal (PT-RS) is mapped.

3. The method of claim 1, further comprising:
transmitting, through a physical sidelink control channel (PSCCH), the first SCI for scheduling of the PSSCH and the second SCI.

4. The method of claim 1, wherein the second SCI is transmitted based on scrambling, modulation, and resource mapping.

5. The method of claim 1, wherein the last modulation symbol of the second SCI is mapped to a subcarrier related to a highest index among subcarriers capable of mapping the second SCI in the RB.

6. The method of claim 1, wherein the reference value is a minimum value among a first value and a second value,
wherein the first value is obtained based on multiplying a sum of the number of bits of the second SCI and the number of CRC bits for the second SCI by the beta offset value, and
wherein the second value is obtained based on the alpha value configured for a resource pool, the number of symbols for PSSCH transmission, and the number of REs for transmission of the second SCI in each symbol.

7. The method of claim 1, further comprising:
selecting a synchronization reference based on the sidelink (SL) synchronization priority,
wherein the SL synchronization priority is set to a global navigation satellite system (GNSS)-based synchronization or a base station (BS)-based synchronization,
wherein the synchronization reference includes at least one of a GNSS, a base station, or a user equipment (UE),
wherein, based on the SL synchronization priority being set to the GNSS-based synchronization, a synchronization priority related to the GNSS is higher than a synchronization priority related to the base station, and
wherein, based on the SL synchronization priority being set to the BS-based synchronization, a synchronization priority related to the base station is higher than a synchronization priority related to the GNSS; and
obtaining synchronization based on the synchronization reference.

8. The method of claim 1, wherein a number of automatic gain control (AGC) symbols is excluded from the number of symbols for PSSCH transmission, and
wherein the number of REs for transmission of the second SCI in each symbol is a value obtained based on subtracting a number of REs for physical sidelink control channel (PSCCH) transmission in each symbol from a number of REs for PSSCH transmission in each symbol.

9. The method of claim 1, wherein the number of CRC bits is 24.

10. A communication device configured to perform sidelink communication, the communication device comprising:
one or more memories storing instructions;
one or more transceivers; and
one or more processors connected to the one or more memories and the one or more transceivers, wherein the one or more processors execute the instructions to perform operations comprising:
obtaining a reference value used for determining a number of modulation symbols for transmission of second sidelink control information (SCI)), based on:
a number of bits of the second SCI;
a number of cyclic redundancy check (CRC) bits for the second SCI;
a beta offset value in first SCI related to the second SCI;
an alpha value configured for a resource pool;
a number of symbols for physical sidelink shared channel (PSSCH) transmission; and
a number of resource elements (REs) for transmission of the second SCI in each symbol;
determining the number of modulation symbols for transmission of the second SCI, based on adding a gamma value to the reference value,
wherein the gamma value is a number of vacant REs in a resource block (RB) to which a last modulation symbol of the second SCI belongs; and
transmitting the second SCI on a PSSCH, based on the number of modulation symbols for transmission of the second SCI.

11. The communication device of claim 10, wherein the second SCI is mapped to a plurality of REs, and
wherein the plurality of REs do not include an RE to which a demodulation reference signal (DMRS) or a phase tracking reference signal (PT-RS) is mapped.

12. The communication device of claim 10, wherein the operations further comprise transmitting, through a physical sidelink control channel (PSCCH), the first SCI for scheduling of the PSSCH and the second SCI.

13. The communication of claim 10, wherein the second SCI is transmitted based on scrambling, modulation, and resource mapping.

14. A processing apparatus for a communication device configured to perform sidelink communication, the processing apparatus comprising:
one or more processors; and
one or more memories operably connected to the one or more processors and storing instructions, wherein the one or more processors execute the instructions to perform operations comprising:
obtaining a reference value used for determining a number of modulation symbols for transmission of second sidelink control information (SCI)), based on:
a number of bits of the second SCI;
a number of cyclic redundancy check (CRC) bits for the second SCI;
a beta offset value in first SCI related to the second SCI;
an alpha value configured for a resource pool;
a number of symbols for physical sidelink shared channel (PSSCH) transmission; and
a number of resource elements (REs) for transmission of the second SCI in each symbol;
determining the number of modulation symbols for transmission of the second SCI, based on adding a gamma value to the reference value,
wherein the gamma value is a number of vacant REs in a resource block (RB) to which a last modulation symbol of the second SCI belongs; and
transmitting the second SCI on a PSSCH, based on the number of modulation symbols for transmission of the second SCI.

* * * * *